US012697782B2

(12) United States Patent
Fabbioli et al.

(10) Patent No.: US 12,697,782 B2
(45) Date of Patent: Aug. 4, 2026

(54) ULTRASONIC WELDING AND RELATED TECHNIQUES FOR LUGGAGE

(71) Applicant: JRSK, Inc., New York, NY (US)

(72) Inventors: Kolette Fabbioli, Jersey City, NJ (US);
Joshua Lin, Kaohsiung (TW); Taylor Alexandra Bagley Armstead,
Brooklyn, NY (US)

(73) Assignee: JRSK, Inc., New York, NY (US)

( * ) Notice: Subject to any disclaimer, the term of this patent is extended or adjusted under 35 U.S.C. 154(b) by 8 days.

(21) Appl. No.: 18/526,474

(22) Filed: Dec. 1, 2023

(65) Prior Publication Data

US 2024/0181718 A1     Jun. 6, 2024

Related U.S. Application Data

(60) Provisional application No. 63/429,285, filed on Dec. 1, 2022.

(51) Int. Cl.
*B29C 65/08*     (2006.01)
*B29K 69/00*     (2006.01)
*B29L 31/00*     (2006.01)

(52) U.S. Cl.
CPC .......... *B29C 65/08* (2013.01); *B29K 2069/00* (2013.01); *B29L 2031/7418* (2013.01)

(58) Field of Classification Search
CPC ... B29C 65/08; B29C 66/73921; B29C 66/21;
B29C 66/24244; B29C 66/30223; B29C
66/3494; A45C 5/03; A45C 5/14

USPC ......................................................... 156/73.1
See application file for complete search history.

(56) References Cited

U.S. PATENT DOCUMENTS

| | | | |
|---|---|---|---|
| 11,214,012 B2 * | 1/2022 | Ogaya ............... | B29C 66/91421 |
| 2020/0345116 A1 | 11/2020 | Korey et al. | |
| 2021/0204663 A1 | 7/2021 | Nichols et al. | |

FOREIGN PATENT DOCUMENTS

EP     3 778 196 A1     2/2021

OTHER PUBLICATIONS

International Search Report and Written Opinion mailed Mar. 15, 2024, in connection with International Application No. PCT/US2023/082023.

* cited by examiner

*Primary Examiner* — James D Sells
(74) *Attorney, Agent, or Firm* — Wolf, Greenfield & Sacks, P.C.

(57) ABSTRACT

The techniques described herein relate to ultrasonic welding and related techniques for luggage. In some embodiments, a method of manufacturing a luggage component is provided that includes orienting a first component adjacent to a second component, wherein a first surface of the first component adjacent a second surface of the second component comprises a flat portion with one or more protrusions extending from the flat portion, and applying, via a horn sized to receive the first component, an ultrasonic vibration to melt the one or more protrusions to ultrasonically weld the first component to the second component.

18 Claims, 26 Drawing Sheets

300

300

300

400

400

Orient a first component adjacent to a second component
802

Apply, via a horn, an ultrasonic vibration
804

Retract the horn
806

ULTRASONIC WELDING AND RELATED TECHNIQUES FOR LUGGAGE

CROSS-REFERENCE TO RELATED APPLICATIONS

The present application claims the benefit under 35 U.S.C. § 119(e) of U.S. Provisional Patent Application No. 63/429,285, filed Dec. 1, 2022, which is hereby incorporated by reference in its entirety.

TECHNICAL FIELD

The techniques described herein are generally related to ultrasonic welding techniques, and in particular to using ultrasonic welding techniques to manufacture consumer goods, such as luggage systems.

BACKGROUND

Luggage systems have evolved greatly over the past 100 years in step with developments in transportation systems (i.e., airports, terminals, bus stations and railways, and ocean liners), electronic communication and computing technologies, and evolving consumer behaviors and lifestyles. Consequently, particular groups of travelers have developed particular sets of expectations when it comes to particular classes of travel. At the same time, manufacturers of luggage systems have worked hard to ensure their evolving lines of luggage systems and related products will meet and satisfy these evolving expectations relating to utility, functionality, aesthetics as well as beauty.

While thousands of luggage systems have been designed, developed, manufactured and sold throughout the global marketplace over the past three decades, for both carry-on and check-in luggage systems alike, there still remains, however, a great need for new and improved luggage systems that address the new ways in which many people like to travel, in styles they feel most comfortable, and with unprecedented levels of convenience which they naturally welcome.

In view, therefore, of these facts and circumstances of the global luggage system marketplace, there is a great need in the art for new and improved luggage systems that better address the ways in which many people like to travel, in a style they feel most comfortable, while enjoying an unprecedented level of convenience which they will naturally welcome, while overcoming the shortcomings and drawbacks of prior art luggage systems, methods and technologies.

SUMMARY

Some embodiments relate to a method of manufacturing a luggage component. The method can include orienting a first component adjacent to a second component, wherein a first surface of the first component adjacent a second surface of the second component comprises a flat portion with one or more protrusions extending from the flat portion, and applying, via a horn sized to receive the first component, an ultrasonic vibration to melt the one or more protrusions to ultrasonically weld the first component to the second component.

In some embodiments, the first component can be a loop boss. In some embodiments, the first component can be a trolley bracket. In some embodiments, the first component can include a polycarbonate plastic. In some embodiments, applying the ultrasonic vibration can have a weld time between 0.3 seconds and 2 seconds. In some embodiments, the method can include holding the first component in place for a cooling time between 1 second and 2 seconds. In some embodiments, the one or more protrusions can include a first number of protrusions on a first side of the first component and a second number of protrusions on a second side of the first component. In some embodiments, an arrangement of the one or more protrusions can be around an outer perimeter of a rectangular shape. In some embodiments, applying the ultrasonic vibration can flatten the one or more protrusions. In some embodiments, the method can include retracting the horn from the first component and the second component. In some embodiments, the horn can be configured to make an orthogonal contact with the first component relative to the first surface. In some embodiments, a cross section of the one or more protrusions can be triangular. In some embodiments, the first surface can be completely flat surrounding one or more protrusions on the first surface.

Some embodiments relate to a luggage component. The luggage component can include a first component adjacent to a second component, and the first component can have a first surface adjacent a second surface of the second component. The luggage component can include an interface with the second surface of the second component and a first portion of the first surface welded to the second surface of the second component.

In some embodiments, the interface can include a melted portion. In some embodiments, the portion of the first surface welded to the second surface can include a flat surface. In some embodiments, the melted portion can be formed by melting one or more protrusions on the first surface. In some embodiments, the first surface can be completely flat surrounding one or more protrusions on the first surface. In some embodiments, an arrangement of the melted portion can be a rectangular shape.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1A:
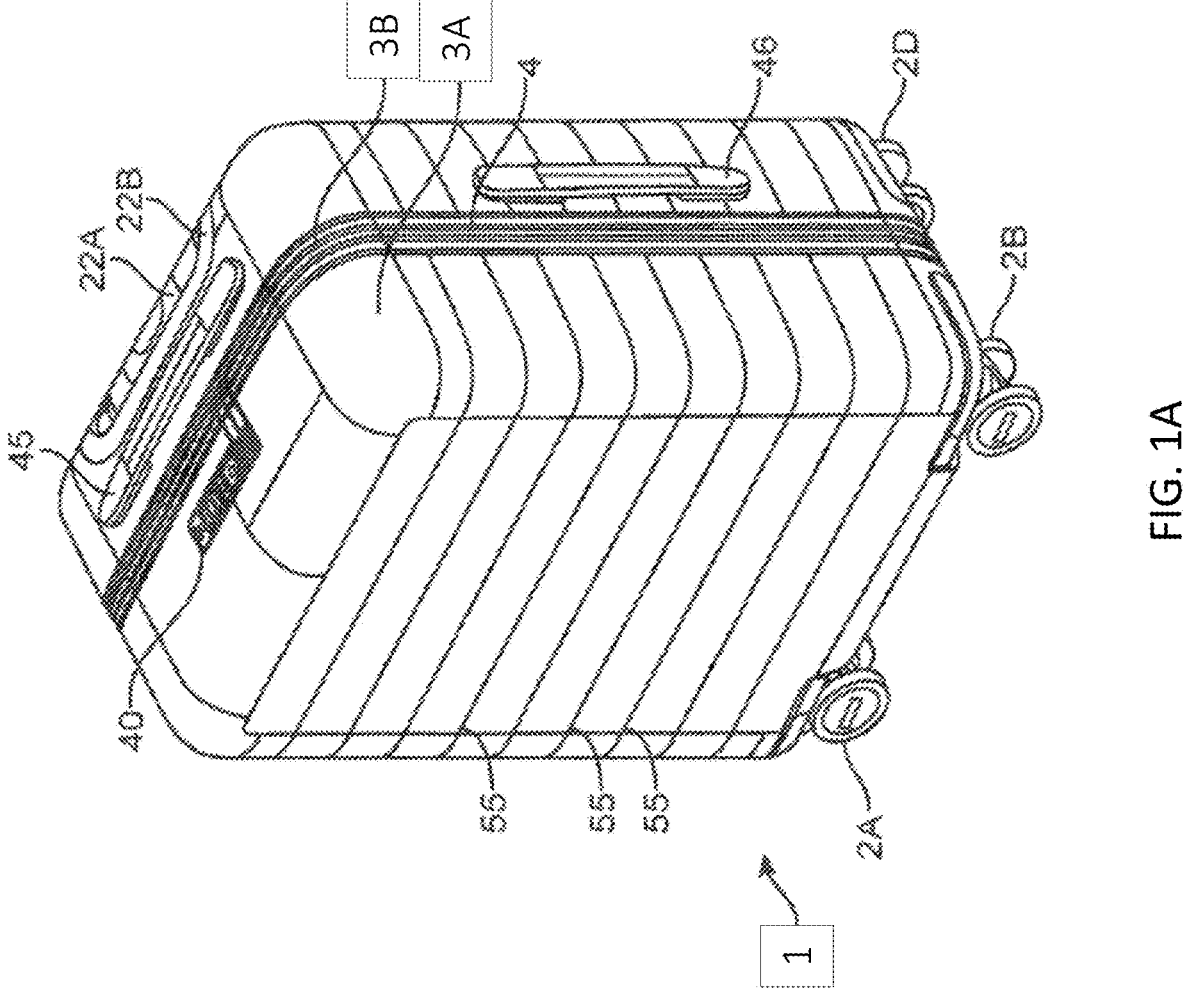
FIG. 1A is a diagram of a front perspective view of an exemplary embodiment of a hard-shell luggage system, according to some embodiments.

Conventional approaches to manufacturing consumer goods typically require the use of glue to affix parts of the consumer good during manufacturing. However, the inventors have appreciated various deficiencies with using glue. For example, glue can add time to the manufacturing process since it can require hours to cure (e.g., eighteen to twenty-four hours). As another example, glue can contaminate a recycling material stream, and thus is not something that can be recycled (and therefore, in-turn, the consumer good may not be recyclable). In addition, glue is often toxic. As a further example, glue can add to the overall manufacturing cost of the consumer good. By way of example, to glue one part onto a luggage system, the cost to use glue can be approximately fifty cents. For large volume manufacturing, such cost can add up quickly. Over three months, for example, the cost to use glue can be tens or hundreds of thousands of dollars.

The techniques described herein provide for ultrasonic welding techniques that can be used to manufacture consumer goods. Ultrasonic plastics assembly generally refers to the joining or reforming of thermoplastics using heat generated from high frequency mechanical motion, which is referred to herein for exemplary purposes as ultrasonic welding. Ultrasonic welding can be accomplished by converting electrical energy into high frequency mechanical motion (e.g., vibrations) that creates frictional heat at the joint area. The vibrations, when applied to a part under pressure/force, create frictional heat at the interface and cause the plastic in the joint area to melt, creating a molecular bond between the plastic components.

According to some embodiments, the techniques can include using a part configuration for a first part that is to be joined to a second part, where the general surface of the first part is flat and/or contoured to the shape of the mating part, and also includes one or more protrusions that extend from the surface. An ultrasonic welding process can be carried out to melt the one or more protrusions to ultrasonically weld the first component to the second component.

As an illustrative example described herein, in some embodiments the part being affixed to the luggage during manufacturing can be a loop boss that is used to mount a metal loop to an interior portion of the cavity of a luggage shell (e.g., a polycarbonate, or PC, shell). The metal loop can, in-turn, be used to support a strap that is part of a compression pad subsystem of the luggage, as described herein. However, the examples described in conjunction with the loop boss are for exemplary purposes and are not intended to be limiting. It should be appreciated that the techniques can be used for various other types of consumer goods as discussed further herein. Further, the techniques can be used to mount other components of luggage as well, such as corner protectors, a trolley base, etc. (e.g., other components currently mounted using other techniques, such as glue, rivets, etc.). Such ultrasonic techniques can eliminate the use of glue, which can allow consumer goods to be recyclable. Further, such techniques can save cost by eliminating the cost associated with the glue.

In some embodiments, the part being affixed can include a series of protrusions (e.g., rectangular, triangular, etc.) that will melt during the welding process to create the bond and results in a flat surface between the parts being welded. In some embodiments, the parts can be designed, other than for the protrusions, to have complementary surfaces to provide for flat or uniform contact between the parts. In some embodiments, complementary components, such as male and female components, can be used such that protrusions can be configured for insertion into corresponding recesses (e.g., which can aid in alignment). Examples of such complementary components can include, for example, a groove, pin and socket, channel, etc. In some embodiments, other components of the consumer good, such as that to which the part is being mounted, need not be changed at all in order to facilitate use of ultrasonic welding. As a result, ultrasonic welding can be used to manufacture consumer goods in a manner that saves both time and cost, and also allows for the good to be recyclable.

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

The techniques described herein provide for using ultrasonic welding to assemble various types of consumer goods. Examples of consumer goods can include luggage systems, as discussed herein in conjunction with some examples. However, it should be appreciated that the techniques are not limited, and can be applied to various other consumer goods, such as hand bags, duffle bags, cases, and/or other consumer goods.

Figure 1B:
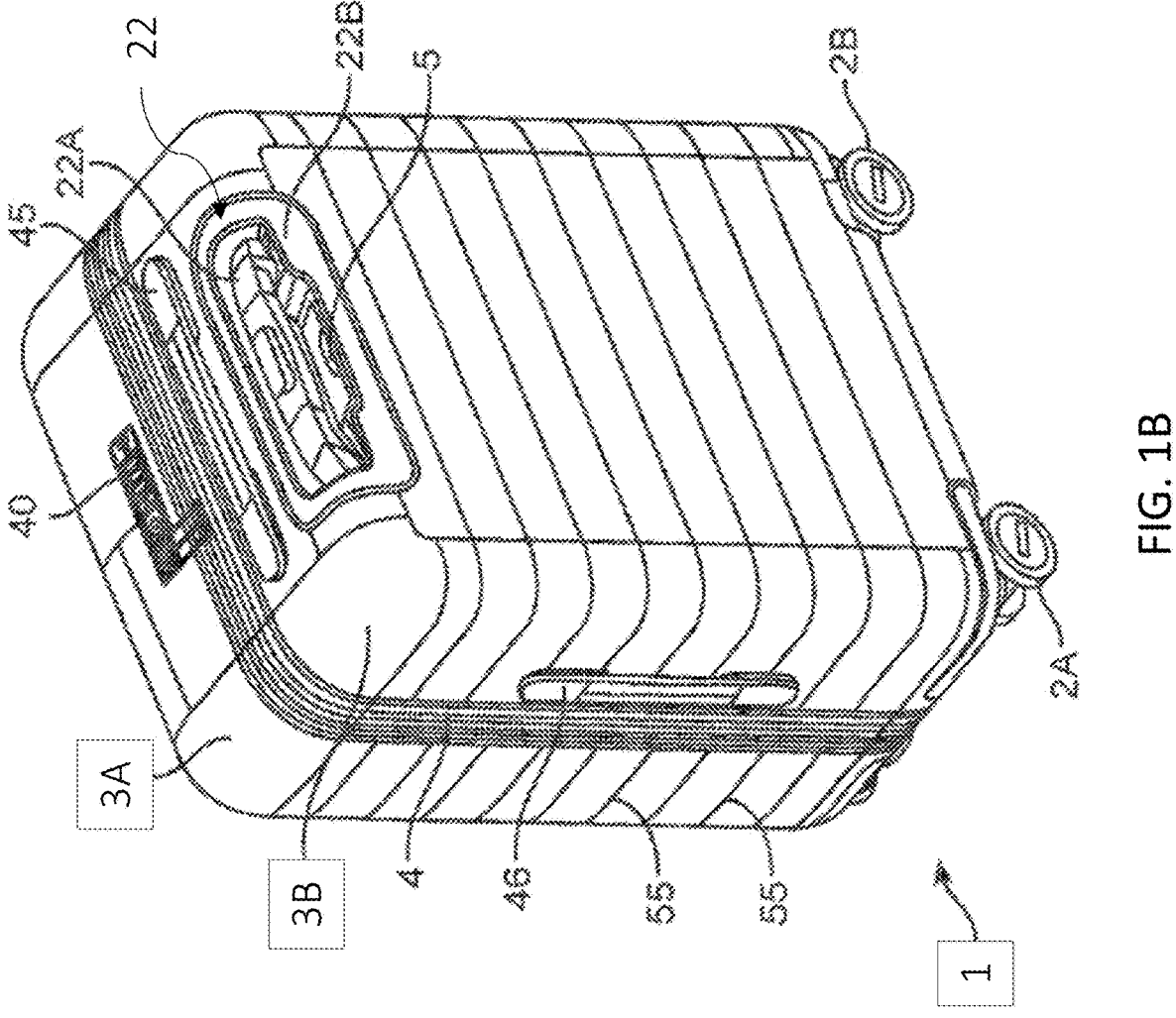
FIG. 1B is a rear perspective view of the hard-shell luggage system of FIG. 1A, according to some embodiments.

FIG. 1A is a front perspective view of an exemplary embodiment of a hard-shell luggage system 1, according to some embodiments. FIG. 1B is a rear perspective view of the hard-shell luggage system 1 of FIG. 1A, showing the components of the system from a different perspective, according to some embodiments.

Referring to FIGS. 1A-1B, the hard-shell luggage system 1 is positioned on its set of four double-spinner wheels 2A, 2B, and 2D mounted in the four corners of the luggage system. As shown, its front and rear hard-shell housing portions (e.g., molded components) 3A and 3B are arranged in a closed configuration and sealed using its integrated zipper mechanism 4. Its telescopic-handle assembly 22 (including handle 22A and associated housing 22B) is arranged in its protracted configuration over a hinged power port cover panel 5. In some embodiments, the hinged power port cover panel 5 conceals USB DC electrical power supply ports and a DC power recharging port, although this is for exemplary purposes only and the cover panel 5 and associated power supply and recharging ports can be omitted.

The front and rear hard-shell housing portions 3A and 3B of the luggage system 1 have a series of horizontally-formed, evenly spaced-apart ridges (e.g., corrugations) 55 formed around the circumference of the front and rear hard-shell housing portions molded from durable plastic material, and up and down along the longitudinal axis of the luggage system 1, as shown, to provide added strength to the housing portions and create an attractive business-like appearance for its user. It should be appreciated that any number, or no ridges, can be used as desired.

FIG. 1A also shows that rear hard-shell housing portion 3B may have top and side handle structures 45 and 46, respectively. Front hard-shell housing portion 3A may have a lock subassembly 40.

Figure 1C:
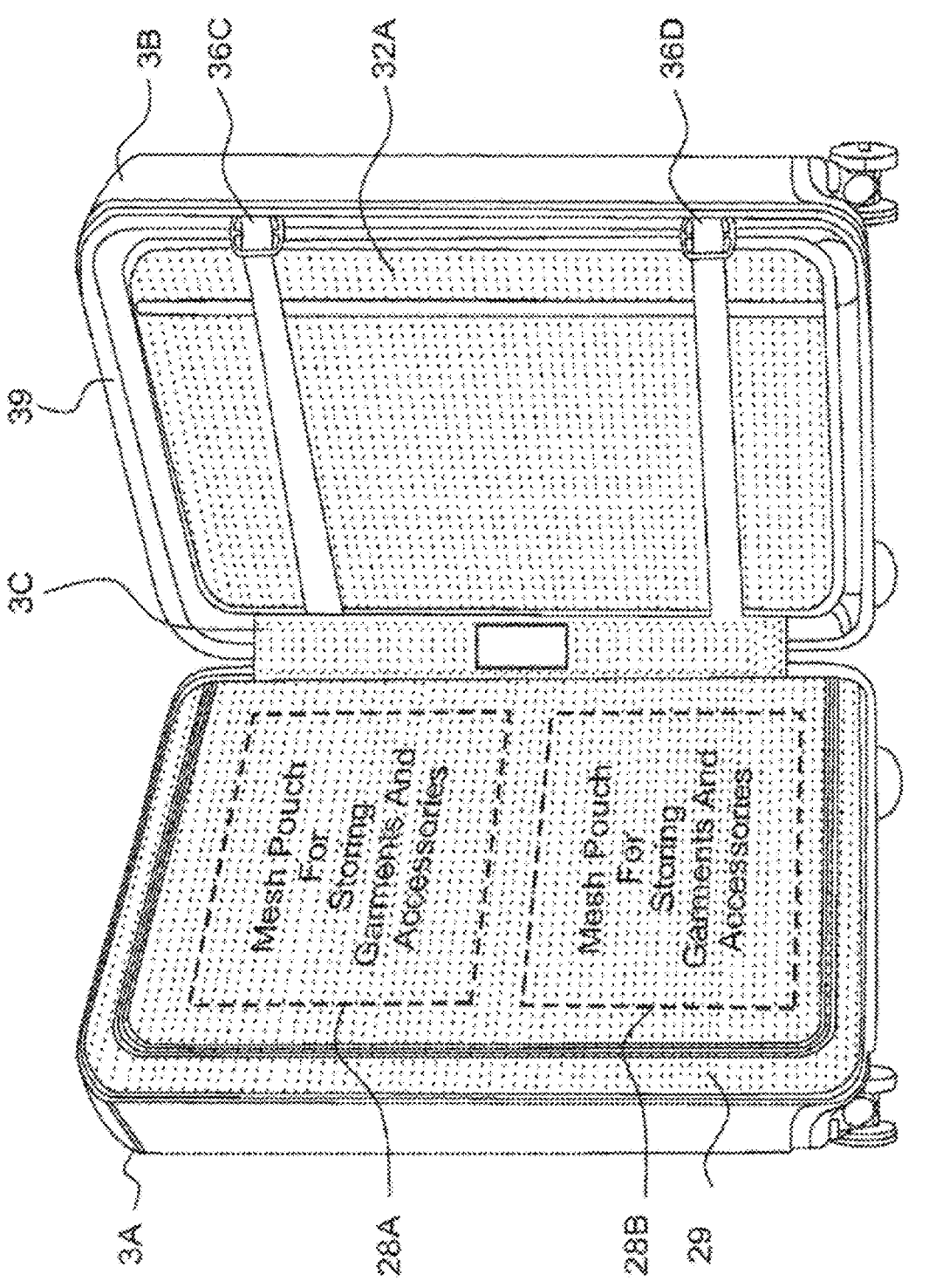
FIG. 1C is a diagram of a front perspective view of the hard-shell luggage system of FIGS. 1A-1B with the front and rear hard-shell housing portions arranged in an open configuration and its integrated zipper mechanism being un-zipped, according to some embodiments.

Referring also to FIG. 1C, the first and second hard-shell housing portions, front and rear hard-shell housing portions 3A and 3B, of the hard-shell luggage system 1 are hinged together and arranged in an open configuration with its integrated zipper mechanism 4 being un-zipped. The telescopic-handle assembly 22 is arranged in its protracted configuration. As shown, a set of mesh pockets 28A and 28B are supported on the interior lining 29 installed within the interior volume of the front hard-shell housing portion 3A of the luggage system. Also, a compression pad structure 32A is fastened and strapped down to the interior volume of the rear hard-shell housing portion 3B by a set of hand-tightened belt-buckles 36C and 36D anchored to the rear hard-shell housing portion through its interior lining installed in the rear hard-shell housing portion 3B. The primary function of the compression pad structure 32A is to compress items located between the compression pad structure 32A and the bottom surface of the rear hard-shell housing portion 3B, which can include (i) shirts, pants and other garments stacked upon (ii) an expandable laundry bag rolled out from a laundry bag storage pouch supported on the molded wheel wells of the rear hard-shell housing portion 3B, and filled with soiled clothes through a zippered access opening. FIG. 1C also shows that an interior lining system 39 may be included. FIG. 1C also shows a gusset 3C.

Figure 1D:
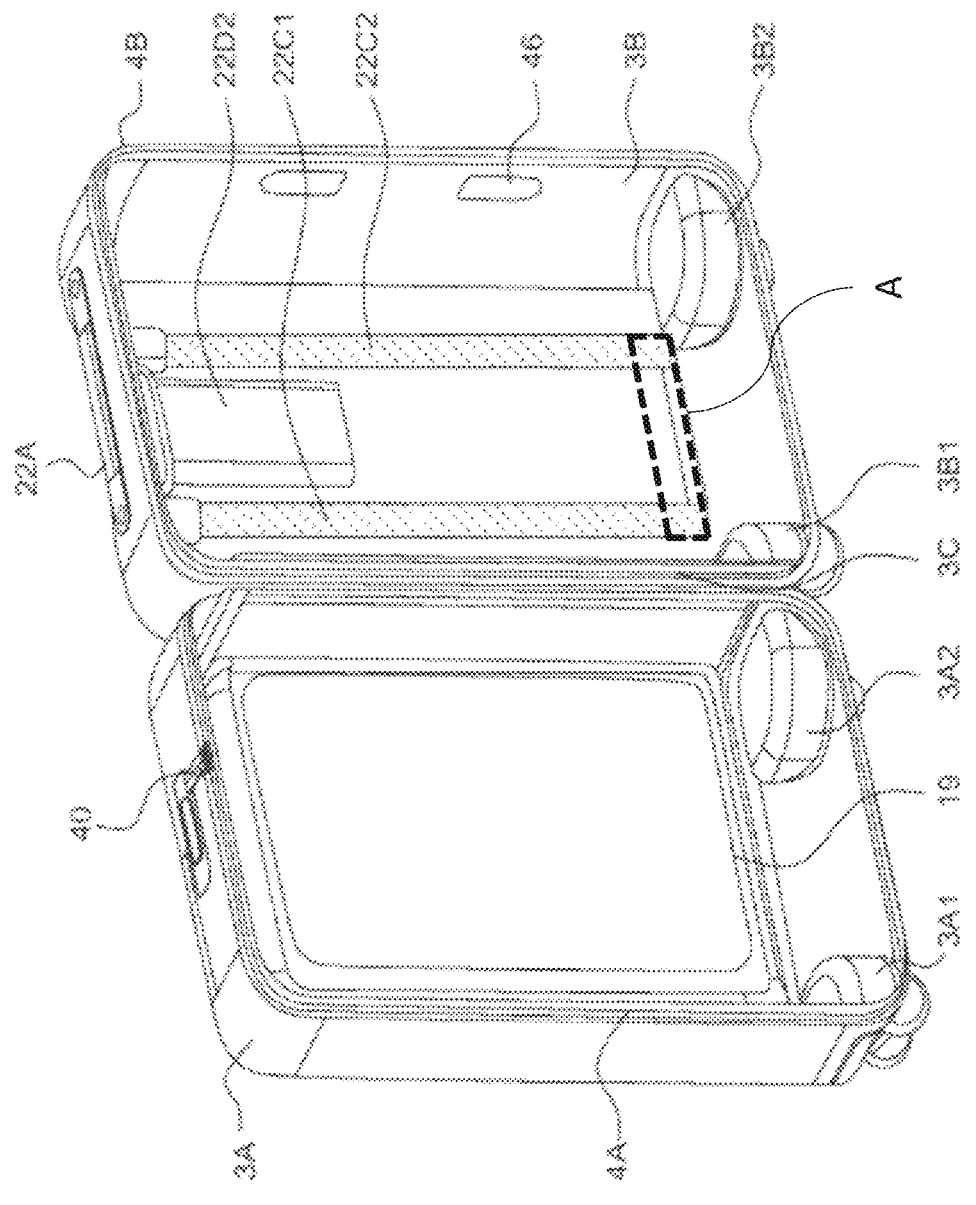
FIG. 1D is a diagram of a front perspective view of the hard-shell luggage system of FIG. 1C with its interior lining removed for purposes of illustration, according to some embodiments.

FIG. 1D shows the hard-shell luggage system 1 with its front and rear hard-shell housing portions 3A and 3B arranged in an open configuration with its integrated zipper mechanism arranged in an unzipped configuration, and its interior lining structures have been removed from both the interior storage volumetric regions of the front and rear hard-shell housing portions of the luggage system 1. The back of portion 3A of the front hard-shell housing portion 3A can be free of other internal components or fixtures. As shown, the telescoping handle and rechargeable power supply assembly, including battery module casing 22D2, is revealed as being mounted to the bottom surface of the rear hard-shell housing portion 3B.

FIG. 1D also shows zipper components 4A and 4B along the openings of the front and rear hard-shell housing portions 3A and 3B. FIG. 1D shows a set of indented wheel-wells 3A1, 3A2, 3B1, and 3B2. FIG. 1D also shows a front access opening 19 of the first hard-shell housing portion.

FIG. 1D also shows a handle 22A with telescoping rods 22C1 and 22C2. The telescoping rods may have selectable lengths. The telescoping rods 22C1 and 22C2 may exhibit resilience where a user may pull (i.e., trolley) along the luggage system. The telescoping rods 22C1 and 22C2 may be made from metal, carbon fiber or plastic materials. In region A of FIG. 1D indicated by dashed lines, a trolley bracket may be disposed. The trolley bracket may be mounted to a bottom surface of the rear hard-shell housing portion 3B, such as using ultrasonic welding as described in relation to FIGS. 7A-7D.

Figure 2A:
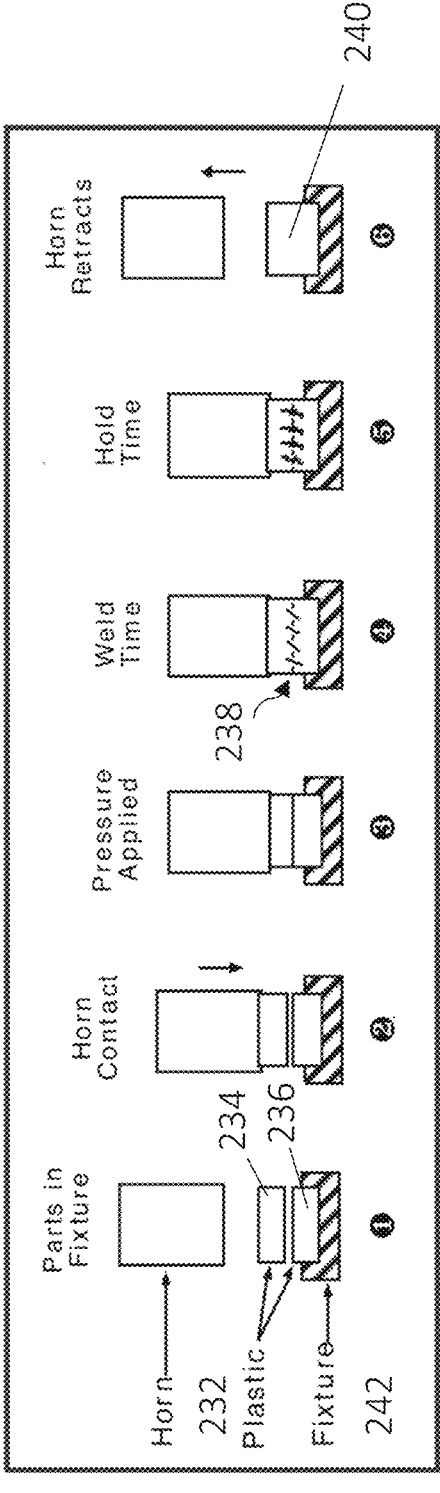
FIG. 2A is an exemplary diagram of an ultrasonic welding process, according to some embodiments.

FIG. 2A is an exemplary diagram of an ultrasonic welding process. At step (1), the two plastic components to be welded, with the top component 234 in this example being welded to the bottom component 236, are arranged next to each other between the welding fixture 242 (used as the base of the welding process) and the horn 232 that is used to perform the ultrasonic welding. The components may be made of polycarbonate plastic. While the components to be welded are described as plastic components, the components are not so limited and other suitable materials may be used. As described further herein, the shape of the horn can be customized to the shape of the part that is being welded by the process. The top component 234 may have a surface adjacent a surface of the bottom component 236. At step (2), the horn is placed into contact with the plastic top component 234. The horn may be configured to make an orthogonal contact with the top component 234 relative to the surface that is adjacent to the surface of the bottom component in that the horn may contact the top component at an angle perpendicular to a plane defined by the surface of the top component. The arrow shown in step (2) indicates the direction of movement of the horn. At step (3), the horn is pressed downward to apply pressure to the plastic fixtures including top component 234 and bottom component 236. At step (4), the ultrasonic welding process is performed for a configurable period of time incorporating ultrasonic vibrations represented by vibrations 238 that cause a portion of the plastic top component 234 to melt with a corresponding part of the bottom component 236. The ultrasonic vibration may be applied via the horn which may be sized to receive the plastic top component 234. The plastic top component 234 may be ultrasonically welded to the bottom component 236. At step (5), a hold time is used for cooling and curing of the plastic components. The hold time may involve holding a component in place. At step (6), the horn retracts from the welded components 240. While the components are described with reference to their relative ordering of top and bottom, these identifiers are relative to the example orientation shown in FIG. 2A.

As described herein, the inventors have appreciated that various part configurations can be useful in achieving a proper ultrasonic welding. In some embodiments, one or more protruding structures can be added to a part surface to facilitate ultrasonic welding. The one or more protruding structures may be added to top component 234 shown in FIG. 2A. In some embodiments, such a part can have a cross-sectional shape, such as a square shape, a circular shape, a triangular shape, and/or the like. FIG. 2B shows a first component 202 with a protrusion 200 with a triangular cross-sectional shape that is used to effect an ultrasonic welding of the first component 202 to the second component 204. The first component 202 may have a first surface 272, and the second component 204 may have a second surface 274 as shown in FIG. 2B. The first surface 272 may be adjacent the second surface 274. The first surface may have a flat portion with one or more protrusions extending from the flat portion. As described herein, a plurality of protruding structures can be added to a surface for ultrasonic welding. FIG. 2B also shows a region 278 that may be configured as a recess to receive the protrusion 200 in some embodiments. In some embodiments, region 278 may not be present and the second surface 274 may be uniform.

Figure 2C:
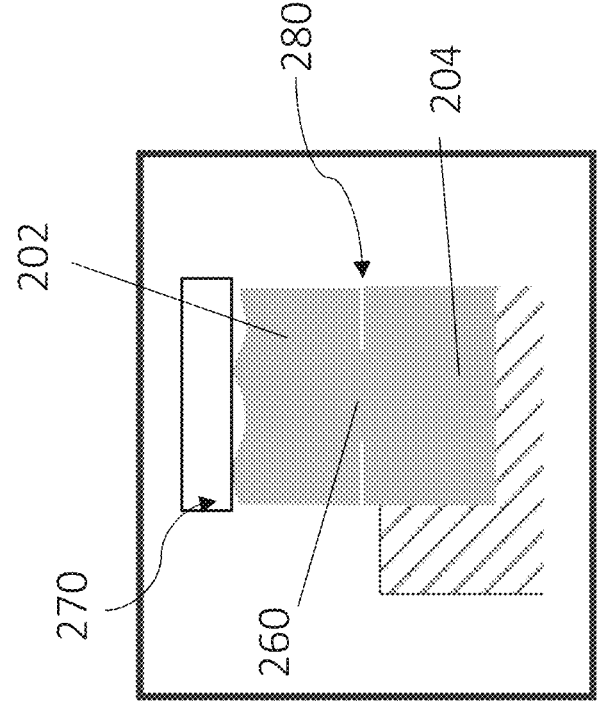
FIGS. 2B and 2C show a component with a protrusion with a triangular cross-sectional shape that is used to effect an ultrasonic welding of the component to another component resulting in welded components, according to some embodiments.
Figure 2B:
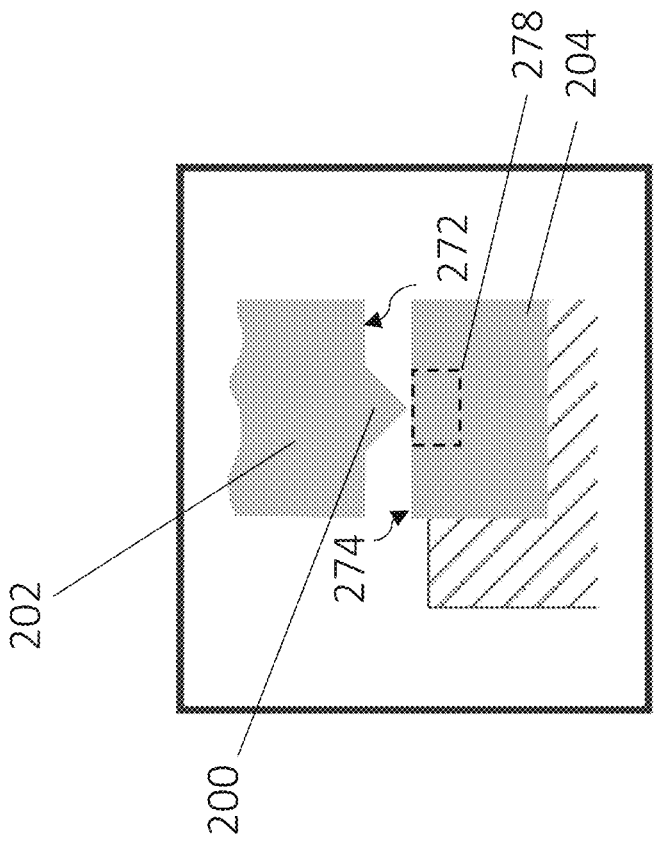

FIG. 2C shows a result of the ultrasonic welding of the first component 202 to a second component 204. As shown in FIG. 2C, the ultrasonic welding of first component 202 to second component 204 results in welded components 270. The welded components 270 may be a luggage component. At an interface 280, a melted portion 260, which may be made of the material of the protrusion of FIG. 2B, may be disposed between the first component 202 and the second component 204. The melted portion 260 may be formed by melting the one or more protrusions. The application of the ultrasonic vibrations may flatten protrusions such as the protrusion shown in FIG. 2B. The interface 280 may include the second surface of the second component and at least one portion of the first surface of the first component. The at least one portion of the first surface may be welded to the second surface at the interface. The at least one portion may have a flat surface. While a space is shown in 2C, the interface 280 is not so limited, and may result in a flat surface between the components being welded with a negligible or nonexistent gap.

Figures 3A, 3B:
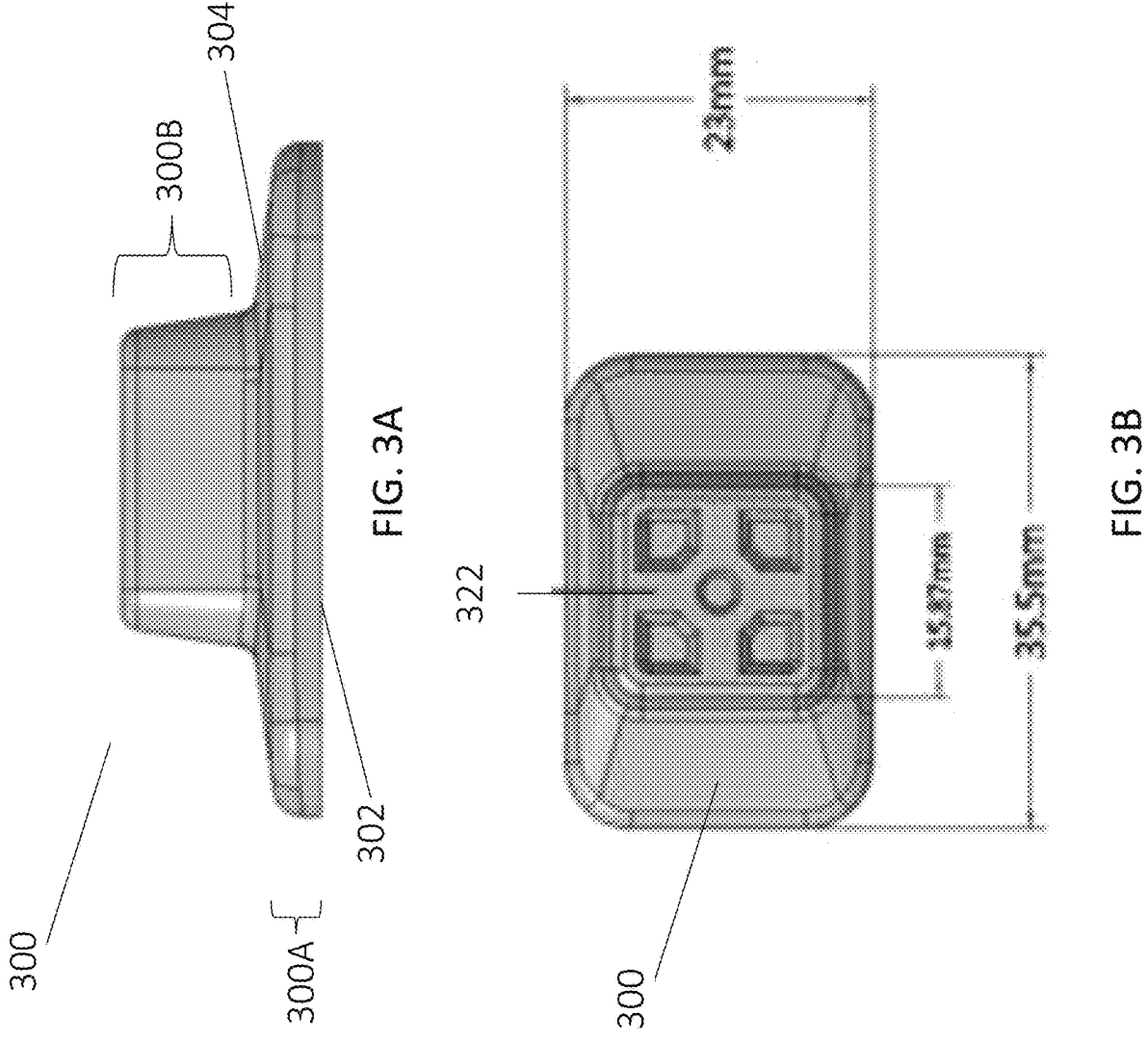
FIGS. 3A-3B are diagrams of an exemplary conventional loop boss, according to some examples.

Conventional approaches can use glue and/or another adhesive to join components. When using glue to affix components, it can be desirable to have flat surfaces between the two components being joined (e.g., which can result in a stronger glue-based bonding between the two components than when using non-flat surfaces). In some embodiments, the surface can include one or more indentations to act as a receiving component for the adhesive. FIGS. 3A-3B are diagrams of an exemplary conventional loop boss 300, according to some examples. FIG. 3A is a side view of the loop boss 300, showing how the bottom surface 302 of the base 300A of the loop boss 300 is flat. Additionally, the top of the base 300A steps upwards as shown by region 304 to the protrusion 300B of the loop boss 300 (where the protrusion 300B is used to receive a screw to affix the loop to the loop boss, as described herein). FIG. 3B is a top-down view of the loop boss 300, showing a top surface 322 of the loop boss 300 and exemplary dimensions of the loop boss 300. The perimeter of the base 300A can be, for example, approximately 23 mm×35.5 mm. The perimeter of the protrusion 300B can be approximately 15.87 mm×15.87 mm.

Figure 3C:
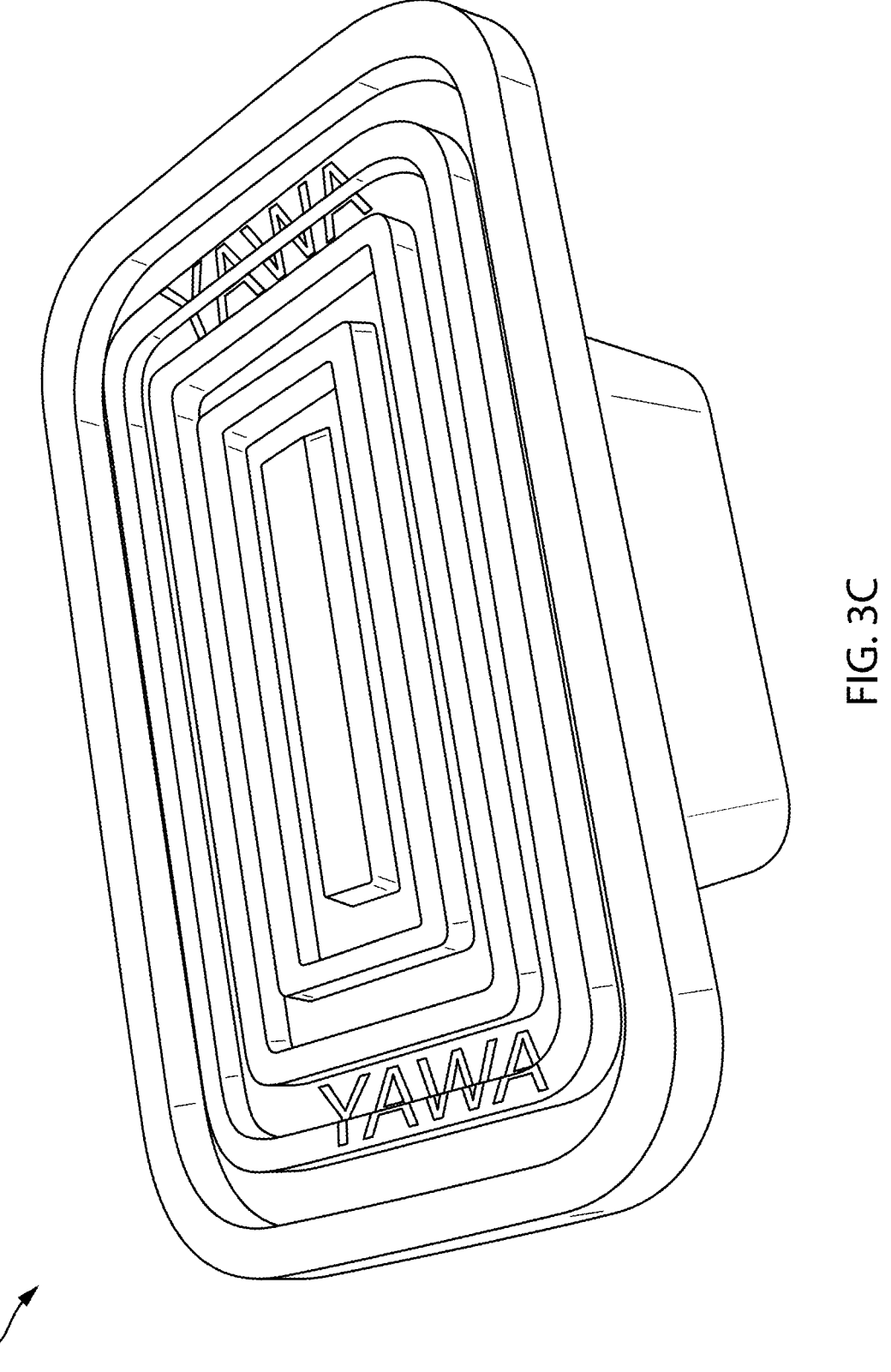
FIGS. 3C-3E are images of an exemplary loop boss, in accordance with some examples.
Figure 3E:
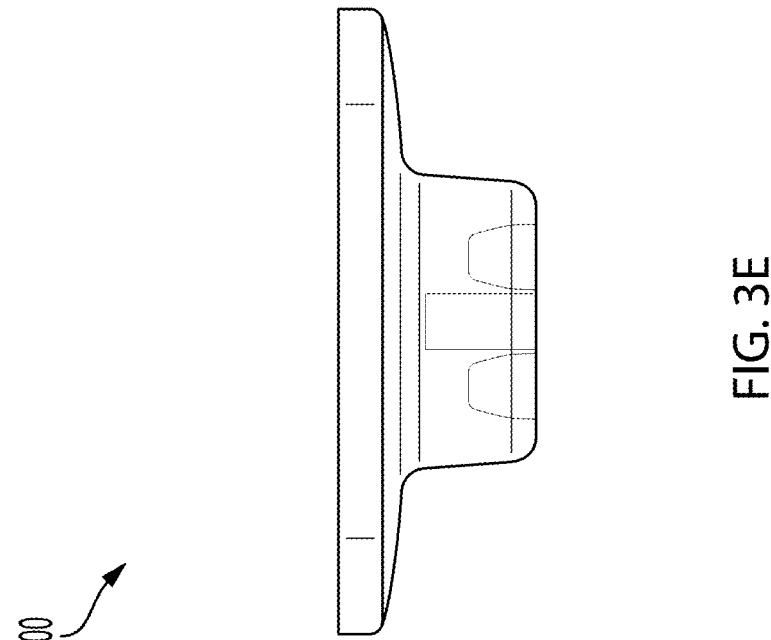
Figure 3D:
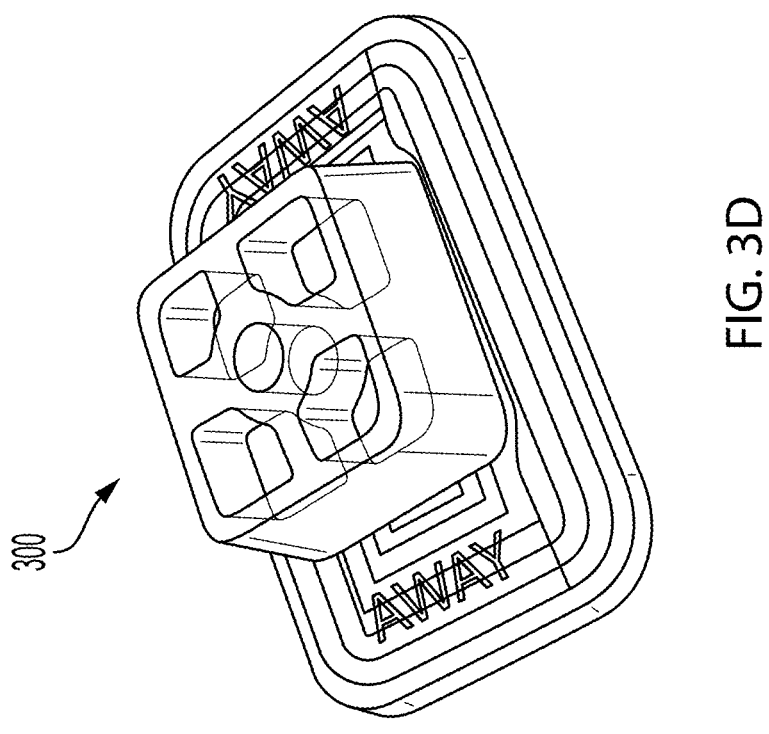

FIGS. 3C-3E are images of an exemplary loop boss, in accordance with some examples. FIG. 3C is an image of the bottom surface of the loop boss, which shows rectangular-shaped indentations on the surface of the loop boss. FIG. 3D is an image of the top of the loop boss, and FIG. 3E is an image of the side of the loop boss.

Figures 4A, 4B:
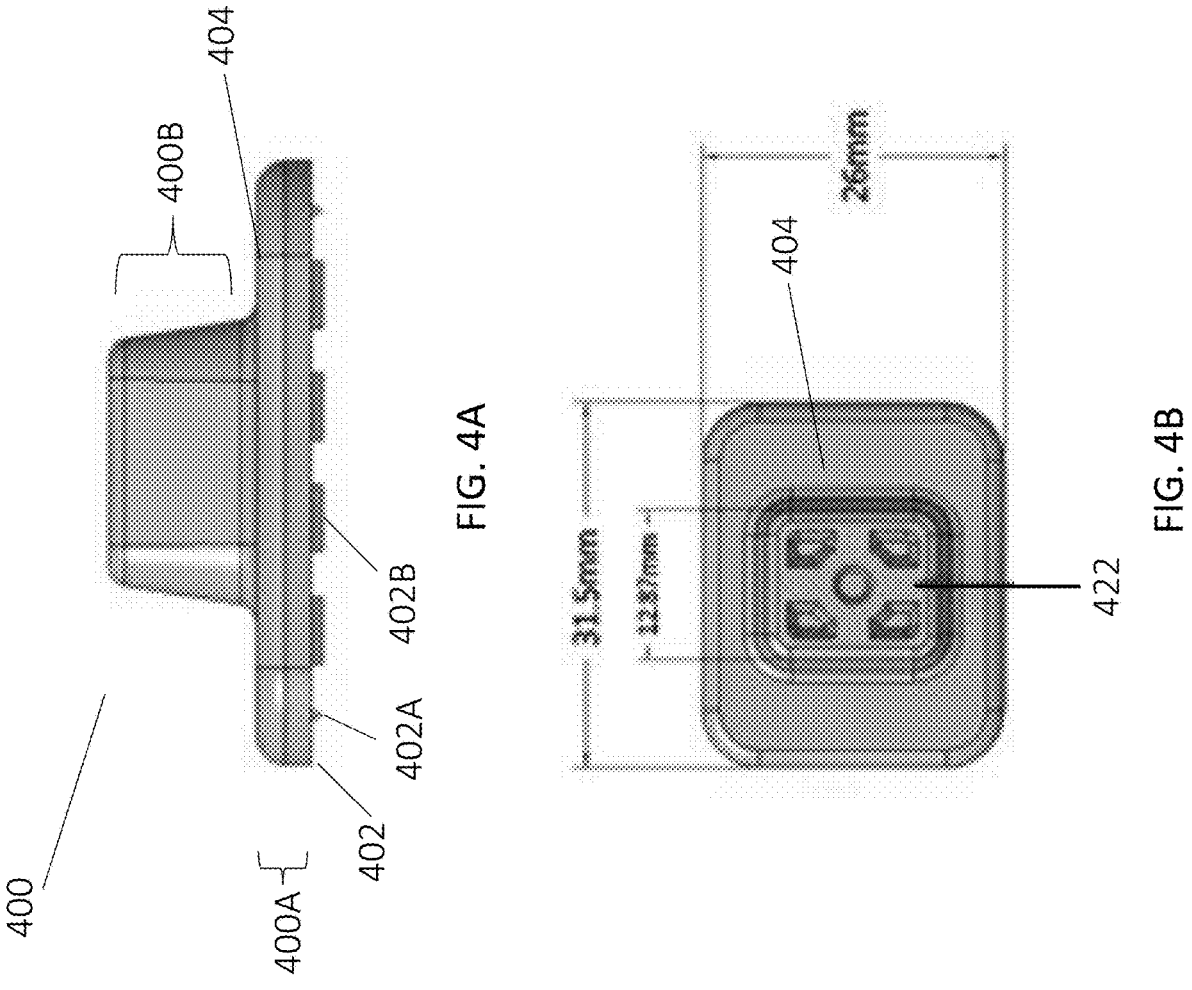
FIGS. 4A-4B are diagrams of an exemplary loop boss, according to the techniques described herein.

As described herein, the inventors have appreciated that for ultrasonic welding applications, it can be desirable to avoid using substantially flat and/or completely flat surfaces for at least one of the components being welded. Accordingly, grooves, protrusions, contours and/or other surface configurations can be added to otherwise conventionally flat portions of components to effectuate an ultrasonic welding. FIGS. 4A-4B are diagrams of an exemplary loop boss 400, according to the techniques described herein. The exemplary loop boss 400 may be used in the ultrasonic welding process shown in FIG. 2A. FIG. 4A is a side view of the loop boss 400, showing how the bottom surface 402 of the base 400A of the loop boss 400 includes protrusions 402A and 402B (along with other protrusions, as shown) along the bottom surface 402. In this example, the protrusions have a triangular cross-sectional shape as shown by the side view of the protrusion 402A that is disposed along the left side of the base 400A of the loop boss 400. Additionally, the protrusions extend along a width dimension as illustrated by protrusion 402B, which extends along the front side of the base 400A. As described herein, the general surface 402 can be flat elsewhere (other than where the protrusions 402A and 402B are present).

Various shapes, sizes and configurations of the protrusions can be used in accordance with the techniques described herein. For example, protrusions can be used with a triangular cross-section as discussed above and/or the protrusions can have curved, square and/or rectangular cross-section(s). Various numbers and placements of the protrusions can be used as well in accordance with the techniques described herein. In some embodiments, the protrusions can be disposed along the perimeter of the base 400A, such as with two, three or four protrusions along each side. A first side of the component may have a first number of protrusions and a second side may have a second number. For example, in some embodiments the shorter sides of the base 400A can include two protrusions, while the longer sides can include four protrusions (e.g., which may have shorter widths than the two protrusions). An illustrative example of such a configuration is shown in conjunction with FIG. 4C. FIG. 4B is a top-down view of the loop boss 400, showing a top surface 422 and exemplary dimensions of the loop boss 400. In this example, the dimensions of the base are approximately 26 mm×31.5 mm, and the dimensions of the protrusion are approximately 12.87 mm square.

Figure 4C:
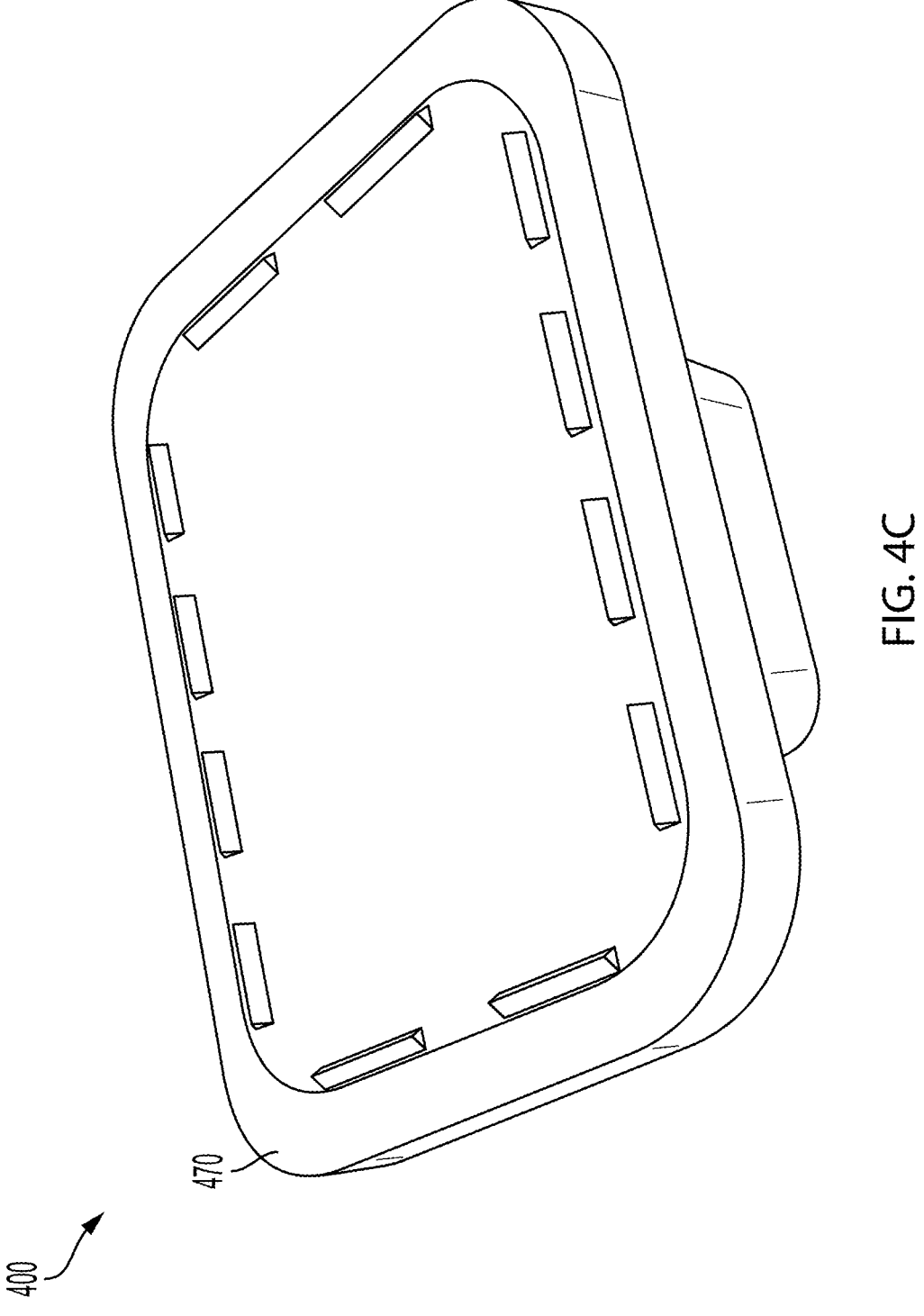
FIGS. 4C-4E are images of an exemplary loop boss, in accordance with some embodiments.
Figure 4E:
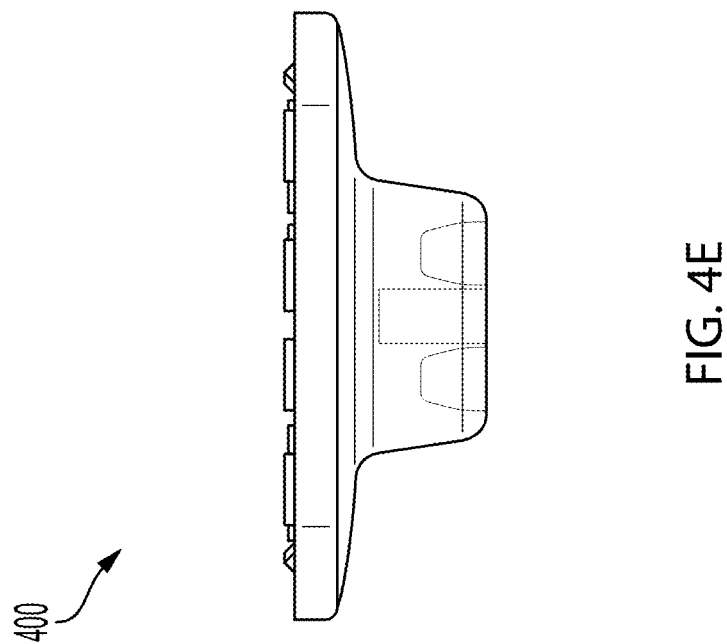
Figure 4D:
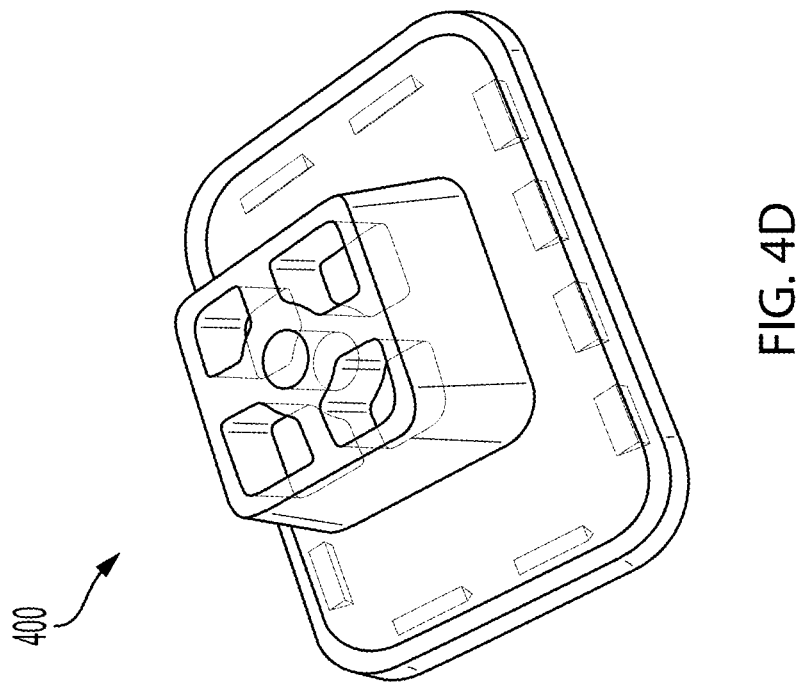

FIGS. 4C-4E are images of an exemplary loop boss, in accordance with some embodiments. FIG. 4C is an image of the bottom surface of the loop boss, which shows triangular-shaped protrusions from the bottom surface of the loop boss. As shown in FIG. 4C, an arrangement of the protrusions is around an outer perimeter of a rectangular shape. A surface of the loop boss 400 may have a flat portion 470. FIG. 4D is an image of the top of the loop boss. FIG. 4E is an image of the side of the loop boss.

Figures 4F, 4G:
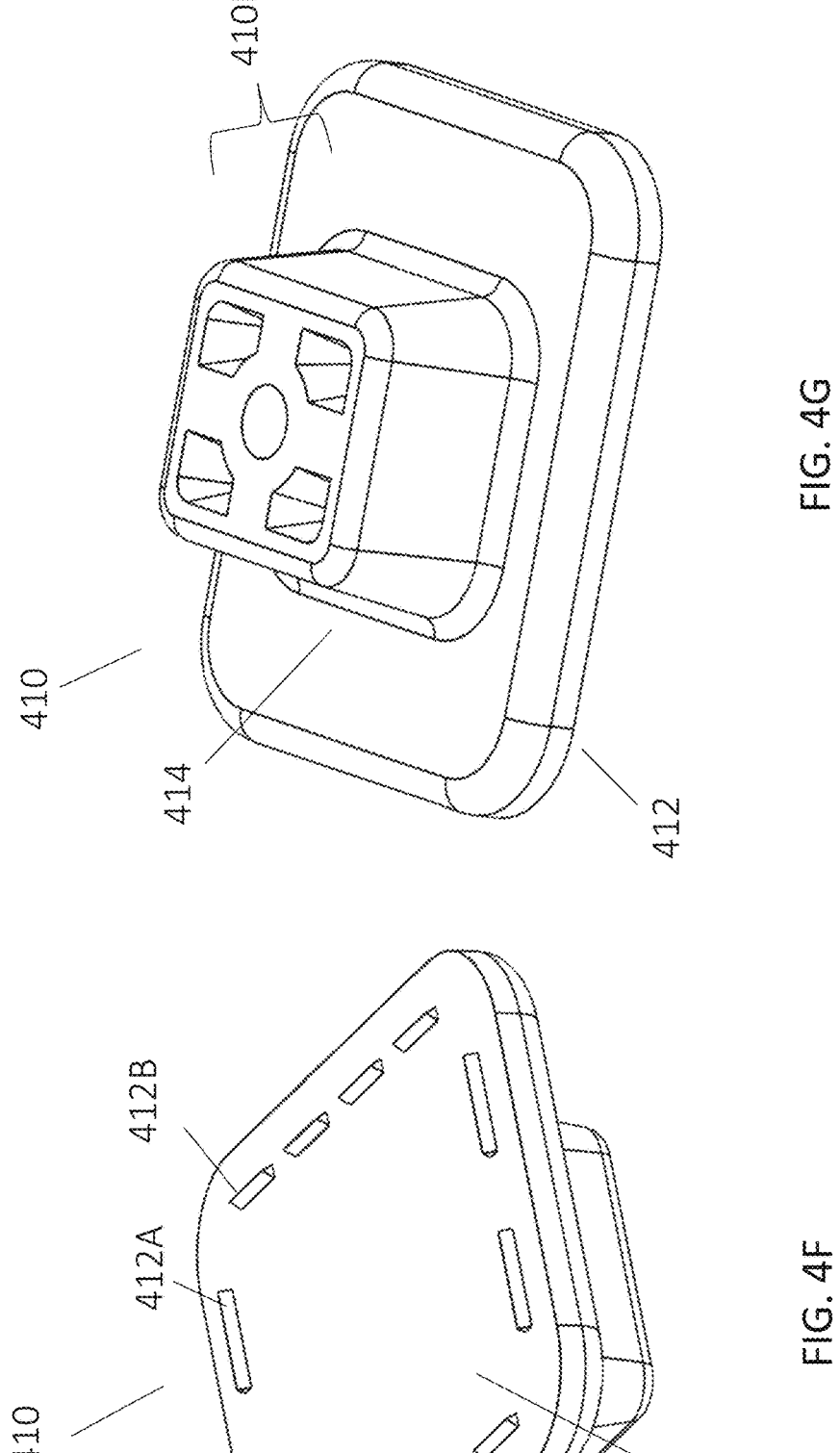
FIGS. 4F-4G are images of an exemplary loop boss, in accordance with some embodiments.

FIGS. 4F-4G are images of an exemplary loop boss, in accordance with some embodiments. FIG. 4F shows a diagram of a loop boss 410 in which a surface 412 is completely flat surrounding one or more protrusions on the first surface. Protrusions 412A and 412B are disposed on the first surface 412. FIG. 4G shows a diagram of the loop boss 410 including region 414 which may be where the protrusion 410B may be used to receive a screw to affix a loop to the loop boss, as described herein.

The inventors have appreciated that sharp contact, such as orthogonal contact, between the pressure direction of the horn and the component being welded can provide a stronger weld compared to softer or non-orthogonal contact. Further, the inventors have appreciated that even contact around the surface of the component can also be desirable. As an illustrative example, the inventors discovered that, for example, the curve around the top perimeter of the loop boss 300 caused uneven contact such that some areas of the conventional loop boss 300 were not being sufficiently welded. As a result, the inventors have appreciated that the part being welded (and also the horn) can be designed to provide sharp contact at the weld portions. Turning back to the loop boss 400 as an example, the top of the base 400A remains flat up until just where the top of the base 400A meets the protrusion 400B of the loop boss 300 as shown by region 404 (where the protrusion 400B is used to receive a screw to affix the loop to the loop boss, as described herein).

Regarding the materials, in some embodiments similar and/or the same materials can be used for the ultrasonic welding since using similar materials can result in a better weld compared to using different materials. For example, if the outer shell of the luggage is a polycarbonate plastic, then the loop boss can likewise be a polycarbonate plastic. The outer shell, at least where the loop bosses are welded, can be of various thicknesses, such as between approximately 1.7-1.9 mm thick.

One or more other considerations can additionally or alternatively be considered when determining how to perform the ultrasonic welding. For example, color can be used to determine parameters of the ultrasonic welding process (e.g., weld time, hold time, cool time, etc.). In some embodiments, color may change the weld time. For example, a high pigment to resin ratio, such as black and white plastics, may change the weld time. In some embodiments, excess plastic material that may occur during the manufacturing process of a component may or may not be taken into consideration for the ultrasonic welding process. For example, regrind (e.g., excess plastic material that is used in the forming of the product that is cut off as waste/by-product) in low amounts may have little effect on the ultrasonic welding process. However, if present in large amounts, the process can be tailored to take into account such anticipated regrind.

Figure 5A:
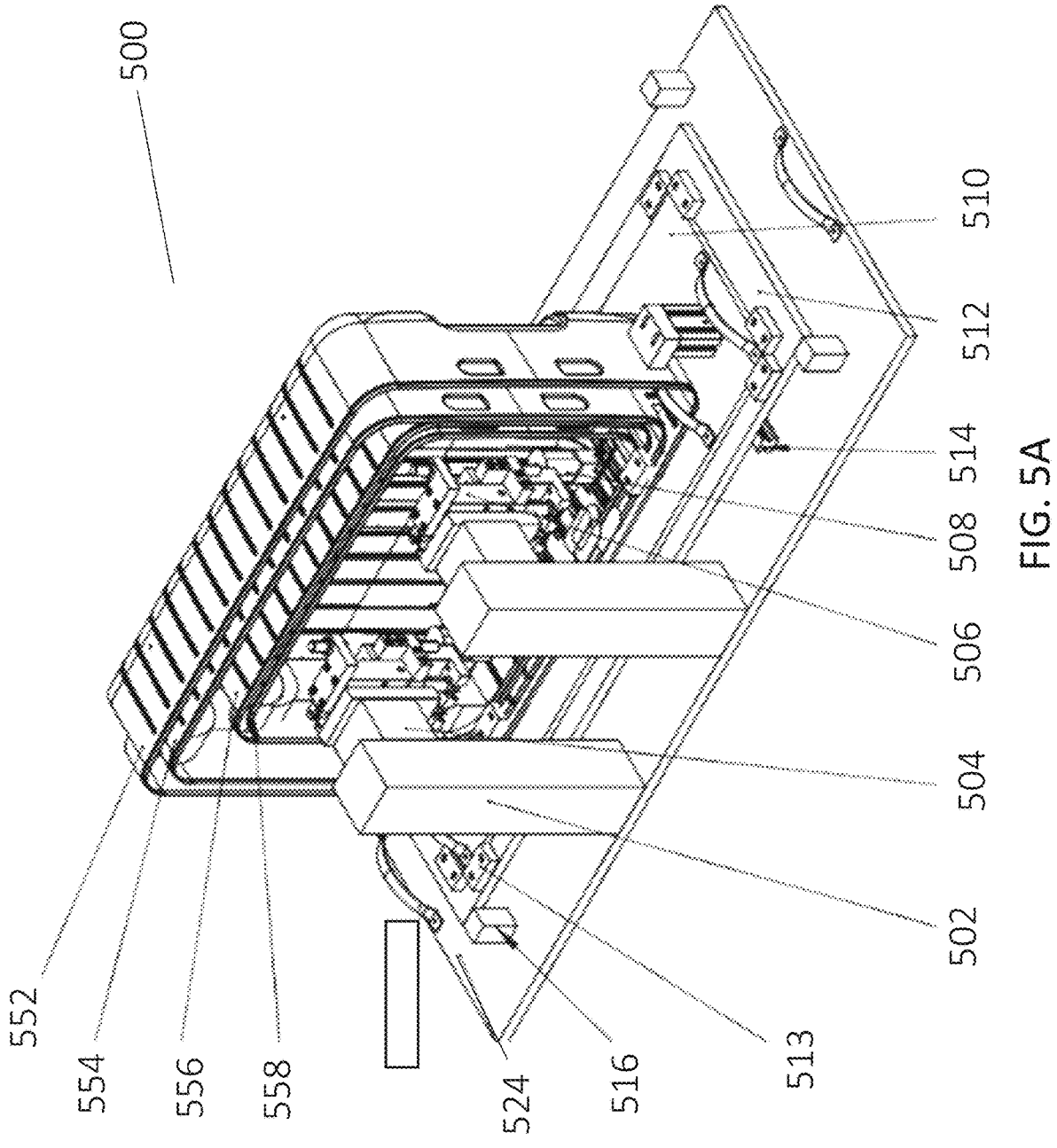
FIG. 5A is a diagram of an exemplary ultrasonic welding machine for welding loop bosses to the interior sides of a luggage shell, according to some embodiments.

FIG. 5A is a diagram of an exemplary ultrasonic welding machine 500 for welding loop bosses to the interior sides of a luggage shell, according to some embodiments. The ultrasonic welding machine 500 can include a pair of arms 502 mounted to a base 524 that include extensions 504 that hold the ultrasonic welding machinery 506 that effectuates the ultrasonic welding via horns 508. The ultrasonic welding machine 500 can be configured for use with a main platform 512 that allows for various luggage sizes to be easily aligned for welding via the ultrasonic welding machine. For example, in some embodiments, the ultrasonic welding machine 500 can be configured for welding loop bosses onto various sizes of luggage, such as that illustrated by the exemplary outer shell portions 552, 554, 556 and 558. The various sizes of outer shell portions 552-558 can be mounted on a platform 510 that can be placed within a main platform 512 and aligned via stops 513. The main platform 512 can be slid into the ultrasonic welding machine 500 via rails 514 and aligned via stops 516. Once the ultrasonic welding is performed by the ultrasonic welding machine, the main platform 512 can be slid out of the ultrasonic welding machine.

Figure 5B:
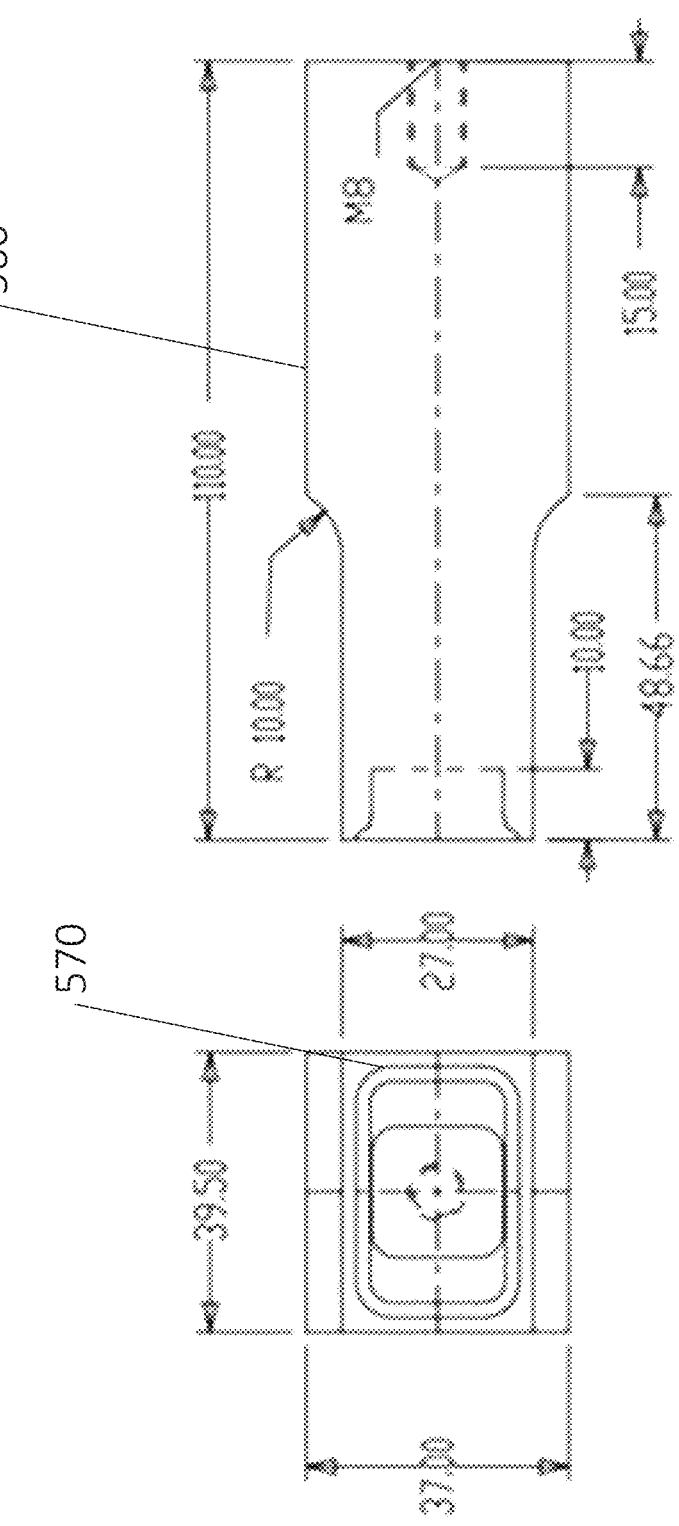
FIG. 5B is a diagram of an exemplary horn used for the ultrasonic welding process of the loop boss, according to some embodiments.
Figure 5C:
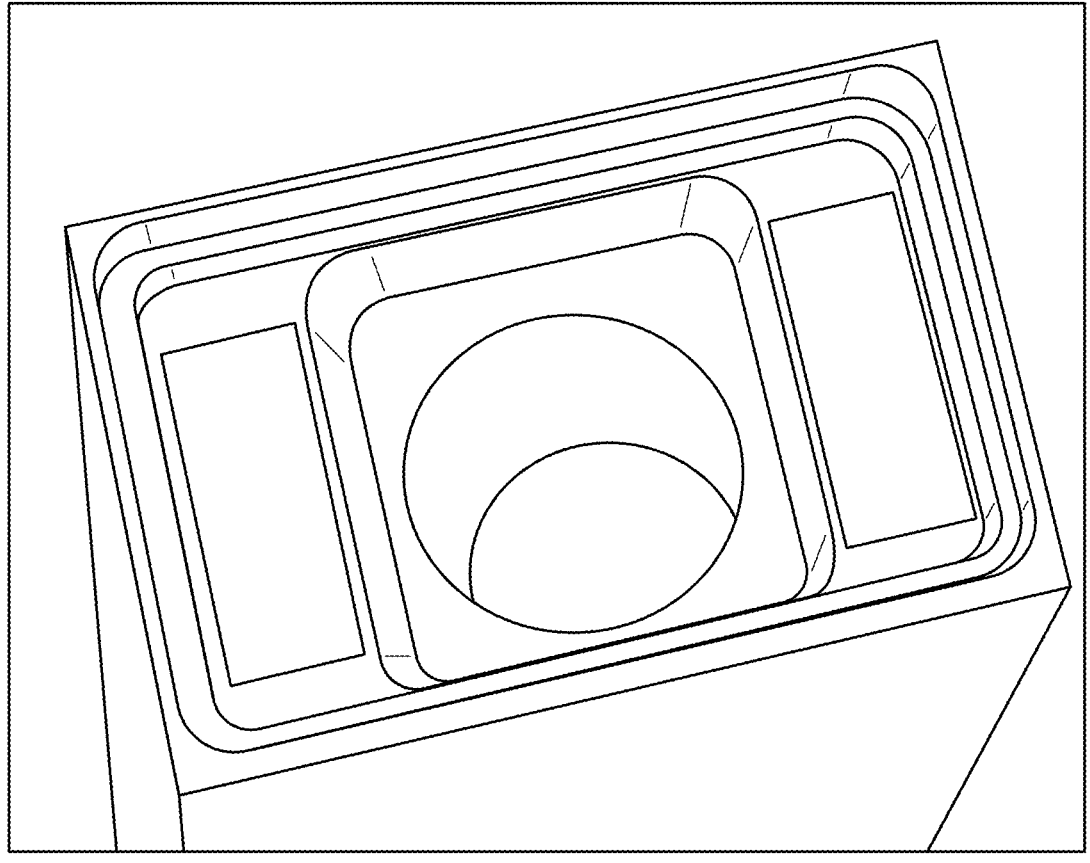
FIG. 5C is an image of the bottom of an exemplary horn configured for welding a loop boss, such as that shown in FIGS. 4C-4E, according to some embodiments.

FIG. 5B is a diagram of an exemplary horn 560 used for the ultrasonic welding process of the loop boss 570, according to some embodiments. In this example, the horn has a length of 110 mm overall, and the base of the horn 560 has outer dimensions of 37 mm×39.50 mm. The base also includes a curved portion of width 27.00 mm that allows for easy alignment with the protrusion of the loop boss 570. FIG. 5C is an image of the bottom of an exemplary horn configured for welding a loop boss such as that shown in FIGS. 4C-4E.

Figure 5D:
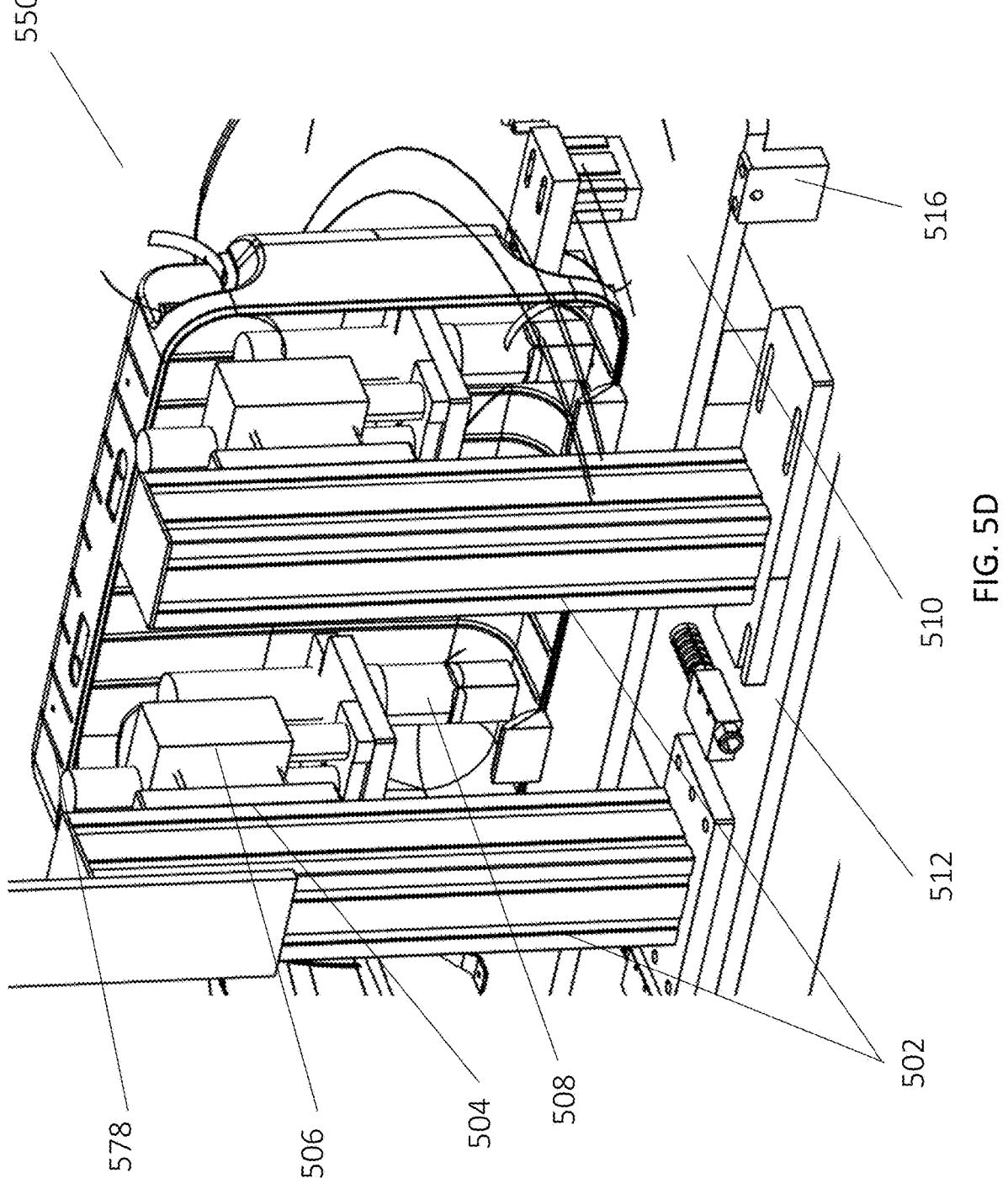
FIGS. 5D-5F are diagrams of an exemplary ultrasonic welding machine for welding loop bosses to the interior sides of a luggage shell, according to some embodiments.
Figures 5E, 5F:
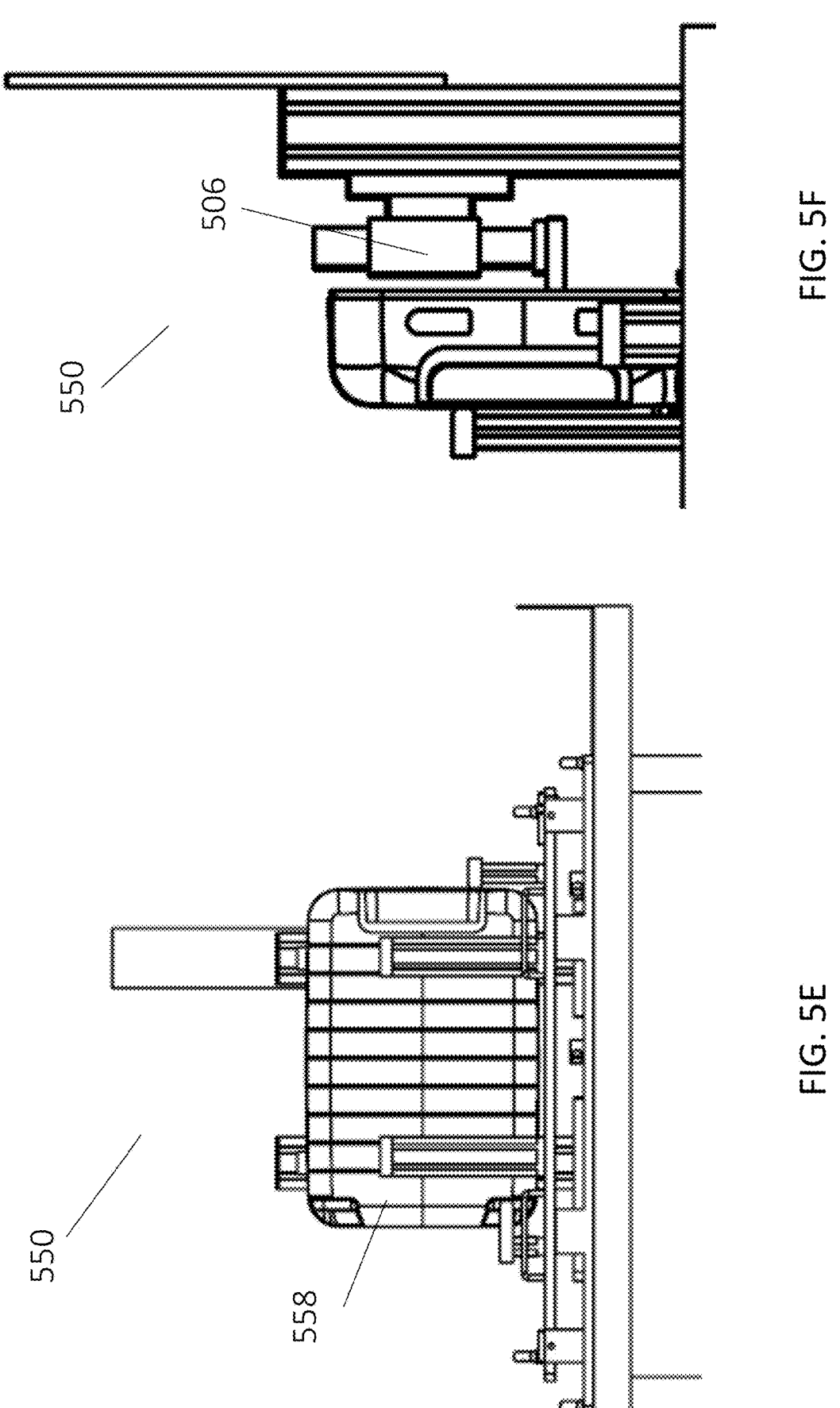

FIGS. 5D-5F are diagrams of another exemplary ultrasonic welding machine for welding loop bosses to the interior sides of a luggage shell, according to some embodiments. FIG. 5D shows that the ultrasonic welding machine 550 can include a pair of arms 502 that include extensions 504 that hold the ultrasonic welding machinery 506 that effectuates the ultrasonic welding via horns 508. The ultrasonic welding machine 550 can be configured for use with a main platform 512 that allows for various luggage sizes to be easily aligned for welding via the ultrasonic welding machine. For example, in some embodiments, the ultrasonic welding machine 550 can be configured for welding loop bosses onto various sizes of luggage, such as that illustrated by the exemplary outer shell portion 578. The outer shell portion 578 can be mounted on a platform 510 that can be placed within the main platform 512. The main platform 512 can be moved into the ultrasonic welding machine 550 and aligned via stops 516. Once the ultrasonic welding is performed by the ultrasonic welding machine, the main platform 512 can be moved out of the ultrasonic welding machine. FIG. 5E shows a back view of the ultrasonic welding machine 550 with outer shell portion 578. FIG. 5F shows a side view of the ultrasonic welding machine 550 with the ultrasonic welding machinery 506.

Figure 5G:
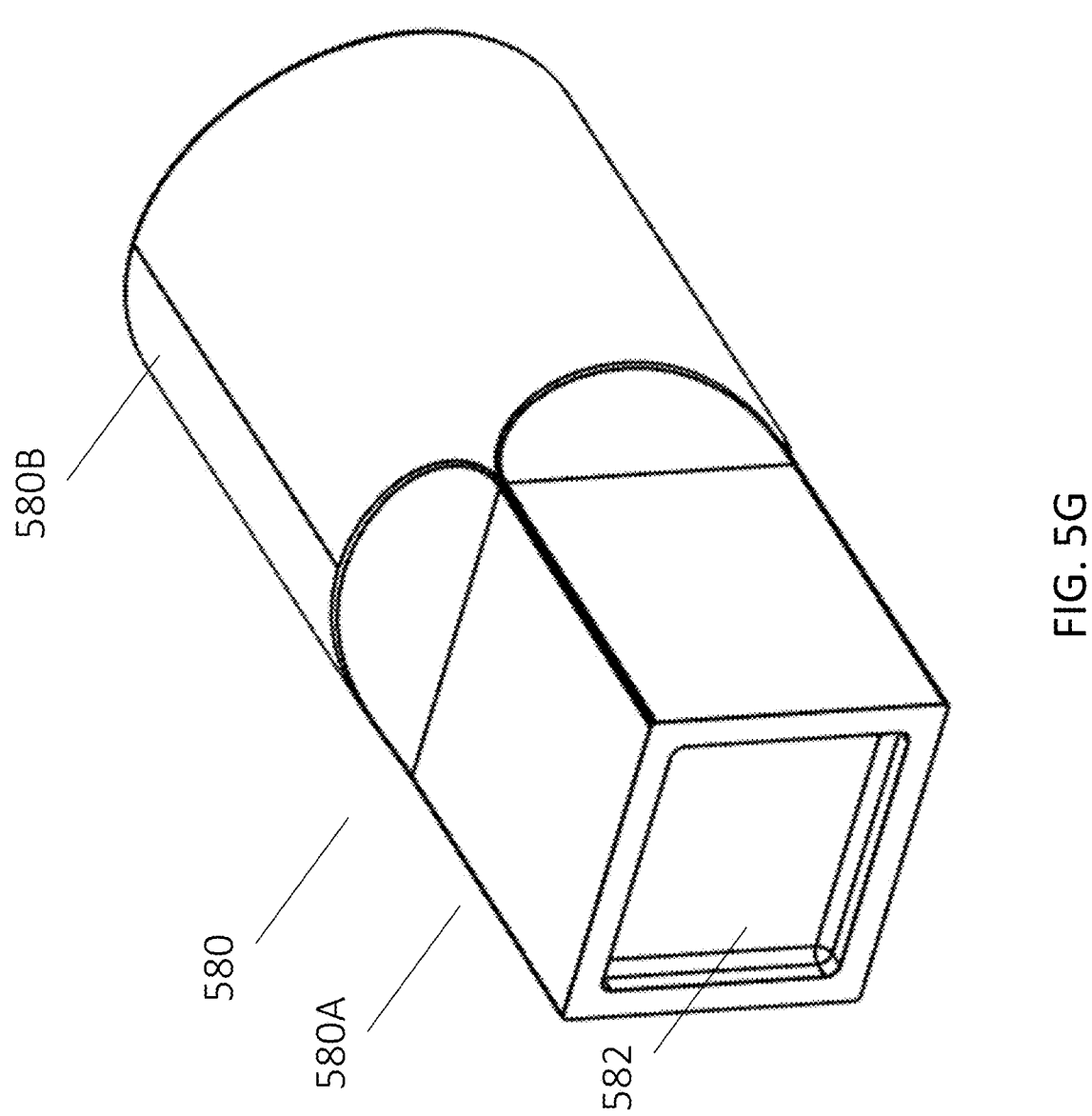
FIGS. 5G-5H are diagrams of an exemplary horn, according to some embodiments.
Figure 5H:
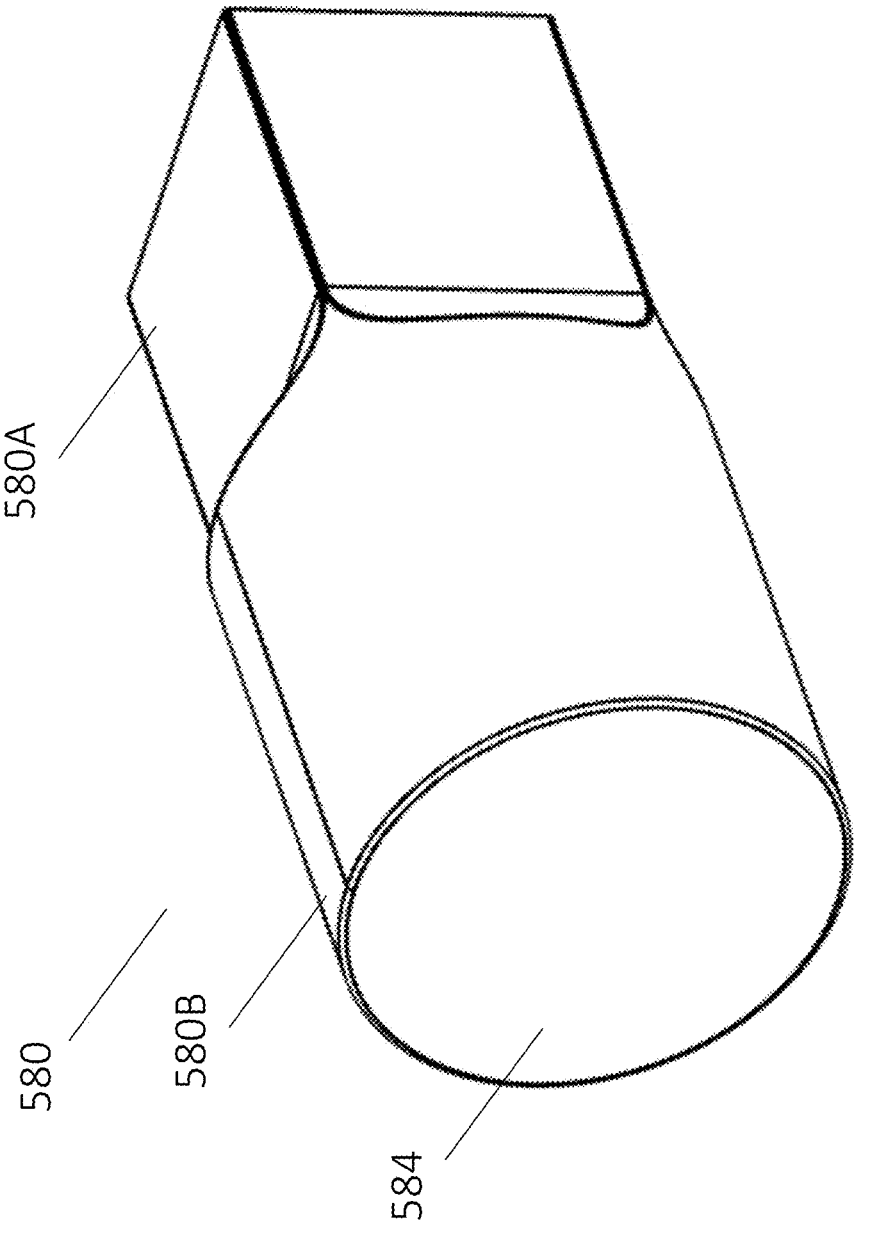

FIG. 5G shows a diagram of an exemplary horn 580. The horn 508 may include a rectangular end 580A (e.g., a square end) with a recessed rectangular cavity 582, which can be sized to receive and/or fit with a component (or a portion of a component, such as a protrusion as discussed herein) for welding the component. For example, the component can include a complementary rectangular portion that fits within the recessed rectangular cavity. The horn 508 may include a spherical end 580B, which can be sized to fit into an ultrasonic welding device. The horn 580 may be configured for welding the component, such as a loop boss and/or a trolley bracket (e.g., as described in relation to FIGS. 7A-7F) as described herein. For example, the horn 580 may be used in connection with the ultrasonic welding machine 550 shown in FIG. 5D and may be configured as horns 508. FIG. 5H shows another view of the diagram of the horn 580. As shown in FIG. 5H, the spherical end 580B of the horn 580 may have a flat surface 584.

Figures 6A, 6B, 6C, 6D:
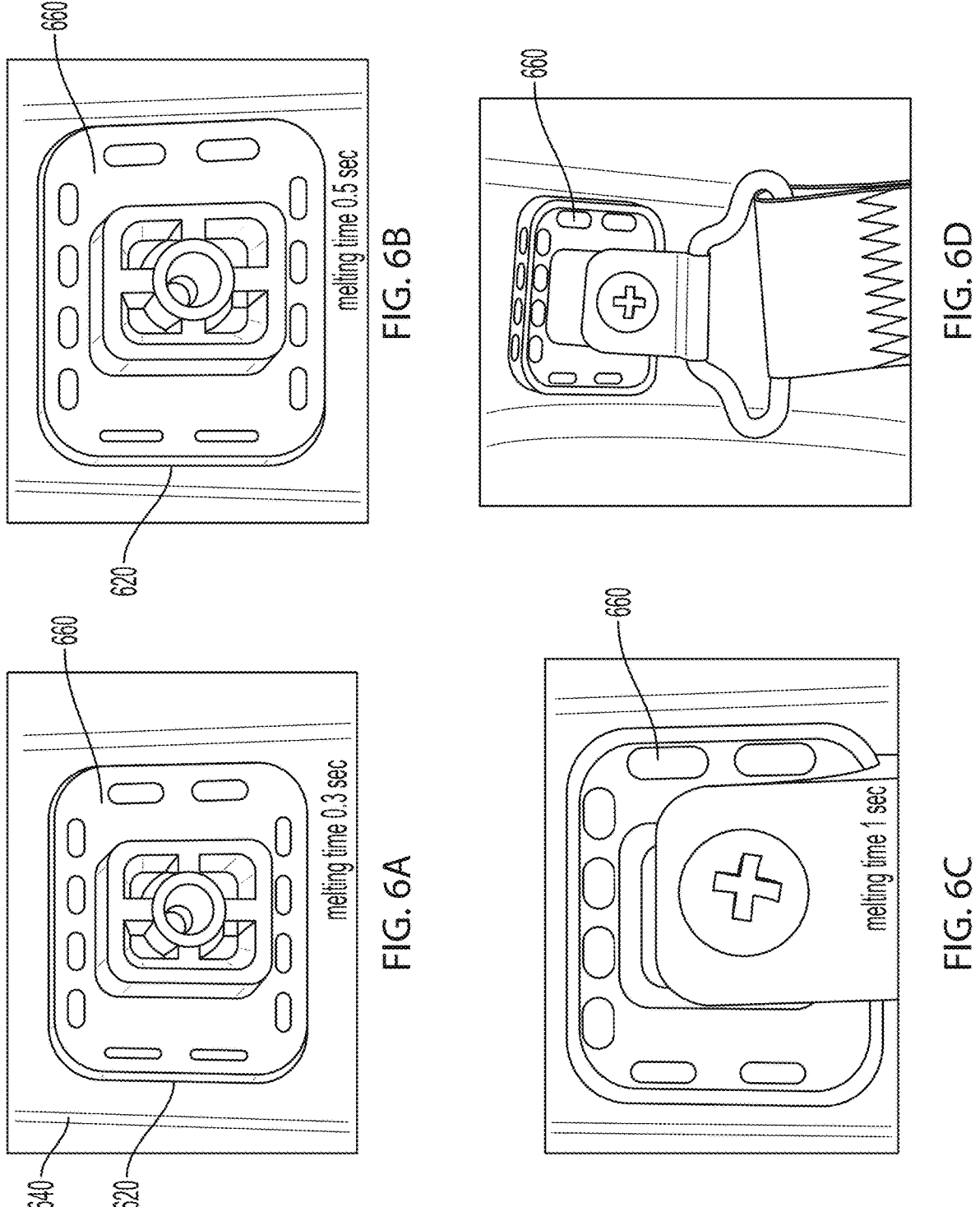
FIGS. 6A-6C are images of various ultrasonic welding trials using different melting/weld times, according to some embodiments.
FIG. 6D shows an example of an ultrasonic welded loop boss with a screw affixed to mount a strap loop to the loop boss, in accordance with some embodiments.

Various parameters of the ultrasonic welding process (e.g., weld time, hold time, cool time, etc.) can be use and/or adjusted according to the techniques described herein. As an illustrative example as shown in FIGS. 6A-6C, the inventors performed various trials using different melting/weld times to determine a sufficient weld time to weld a polycarbonate loop boss 660 to a polycarbonate outer shell 640. In this example, the loop boss 660 includes features of the loop boss discussed in conjunction with loop boss 400 and 410, as described herein. The loop boss and outer shell may form a luggage component. The illustrative example as shown in FIGS. 6A-6C may be obtained using the ultrasonic welding process shown in FIG. 2A. While the loop boss 660 and outer shell 640 are described as a polycarbonate loop boss and a polycarbonate outer shell, the application is not so limited, and other suitable materials may be used for the loop boss and outer shell as described herein. The polycarbonate loop boss 660 included a configuration similar to that discussed in conjunction with FIG. 4C, with two protrusions along two opposite sides and four protrusions along the other two opposite sides of the base of the loop boss.

For the result shown in FIG. 6A, a 0.3 second weld time was used. For the result shown in FIG. 6B, a 0.5 second weld time was used. For the result shown in FIG. 6C, a 1 second weld time was used. The weld time may be between 0.3 seconds and 2 seconds, or any value within that range. The result may include a melted portion at an interface 620. The protrusions of the configuration in FIG. 6A have an arrangement that is a rectangular shape, and the melted portion may also have an arrangement that is a rectangular shape in some embodiments. While not shown in the figures, longer weld times were also tested (e.g., 2 seconds), however marks were observable on the outer surface of the hard shell. Thus, a 1 second weld time for this illustrative testing achieved the best melting of the protrusions. Accordingly, an exemplary set of ultrasonic welding parameters includes 1 second weld time and 1.5 sec cooling time (where pressure can be applied during this period). The cooling time can also be adjusted, such as providing for a 1 second cooling time, a 2 second cooling time, and/or the like. The cooling time may be between 1 second and 2 seconds, or any value within that range. Regardless, it can be appreciated that the cooling times for ultrasonic welds are orders of magnitude shorter than that required for conventional gluing. FIG. 6D shows an example of an ultrasonic welded loop boss with a screw affixed to mount the strap loop to the loop boss, in accordance with some embodiments. FIG. 6D thus shows a final installation of a loop for the strap that is used to tighten or loosen the compression pad (e.g., as discussed in conjunction with FIG. 1C). Ultimately, once the screw attaches the loop to the loop boss, the loop can in-turn serve as the anchor for one end of a compression strap. Accordingly, a set of loop bosses can be mounted to the luggage using the techniques described herein (e.g., one pair for each compression strap when using two compression straps).

While examples described herein are described in conjunction with ultrasonic welding of a loop boss to the outer shell of a luggage system, it should be appreciated that this is for exemplary purposes only and the techniques are not so limited. The techniques can be applied to join any component to a corresponding portion of a consumer good, such as various types of luggage (e.g., that with or without a hard outer shell) and/or various components of the luggage (e.g., corner protectors, handles, wheels, wheel wells, etc.). Without wishing to be bound by theory, for a part that has a greater thickness, additional welding time and/or cooling time may be performed. In some embodiments, for example, the welding time may be greater than 2 seconds, greater than 3 seconds, and/or any desired time for welding (e.g., based on thickness). In some embodiments, the cooling time may be greater than 2 seconds, greater than 3 seconds, and/or any desired time for welding (e.g., based on thickness).

Figures 7A, 7B:
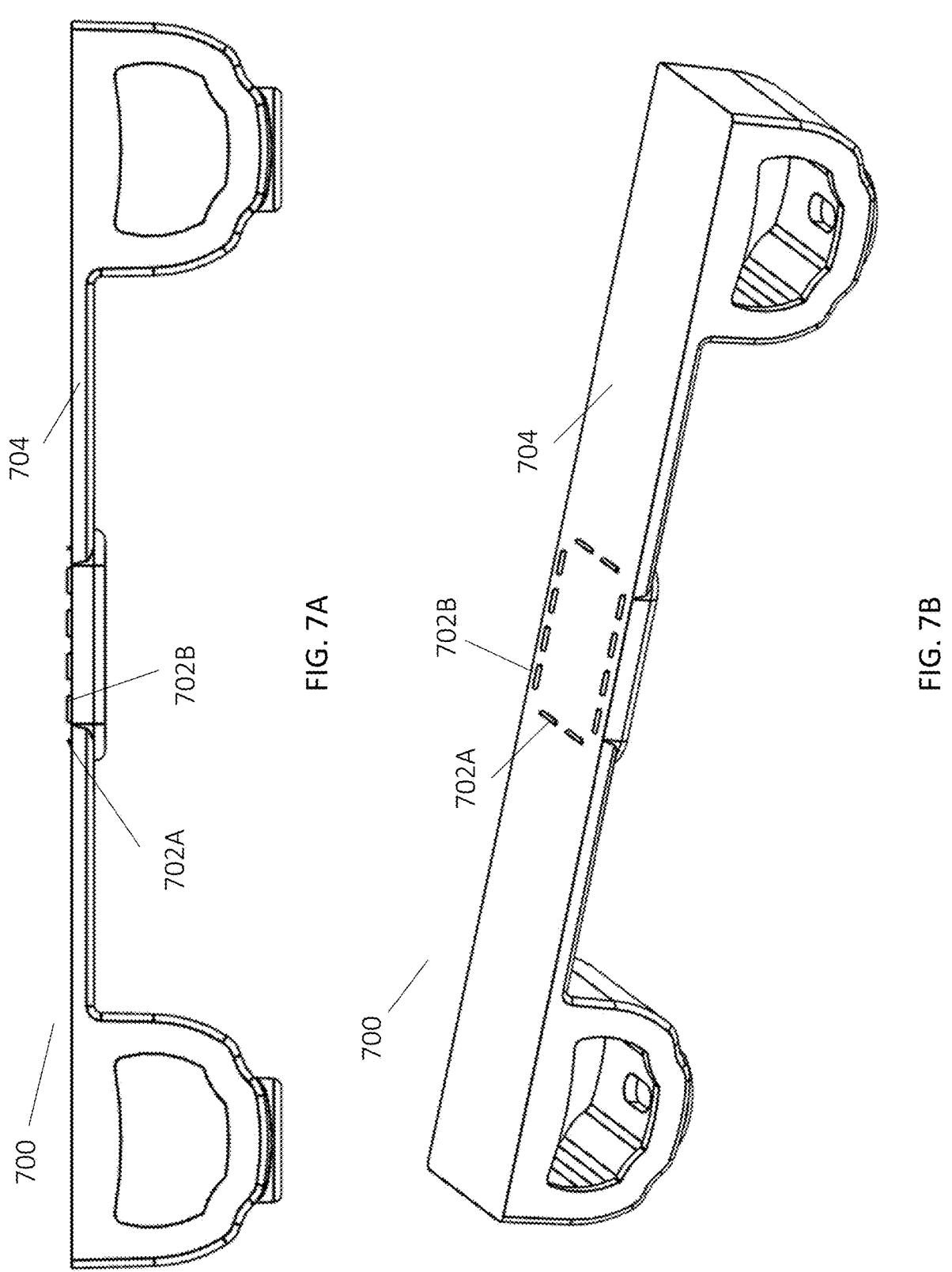
FIGS. 7A-7C are diagrams of an exemplary trolley bracket, according to the techniques described herein.
Figures 7C, 7D:
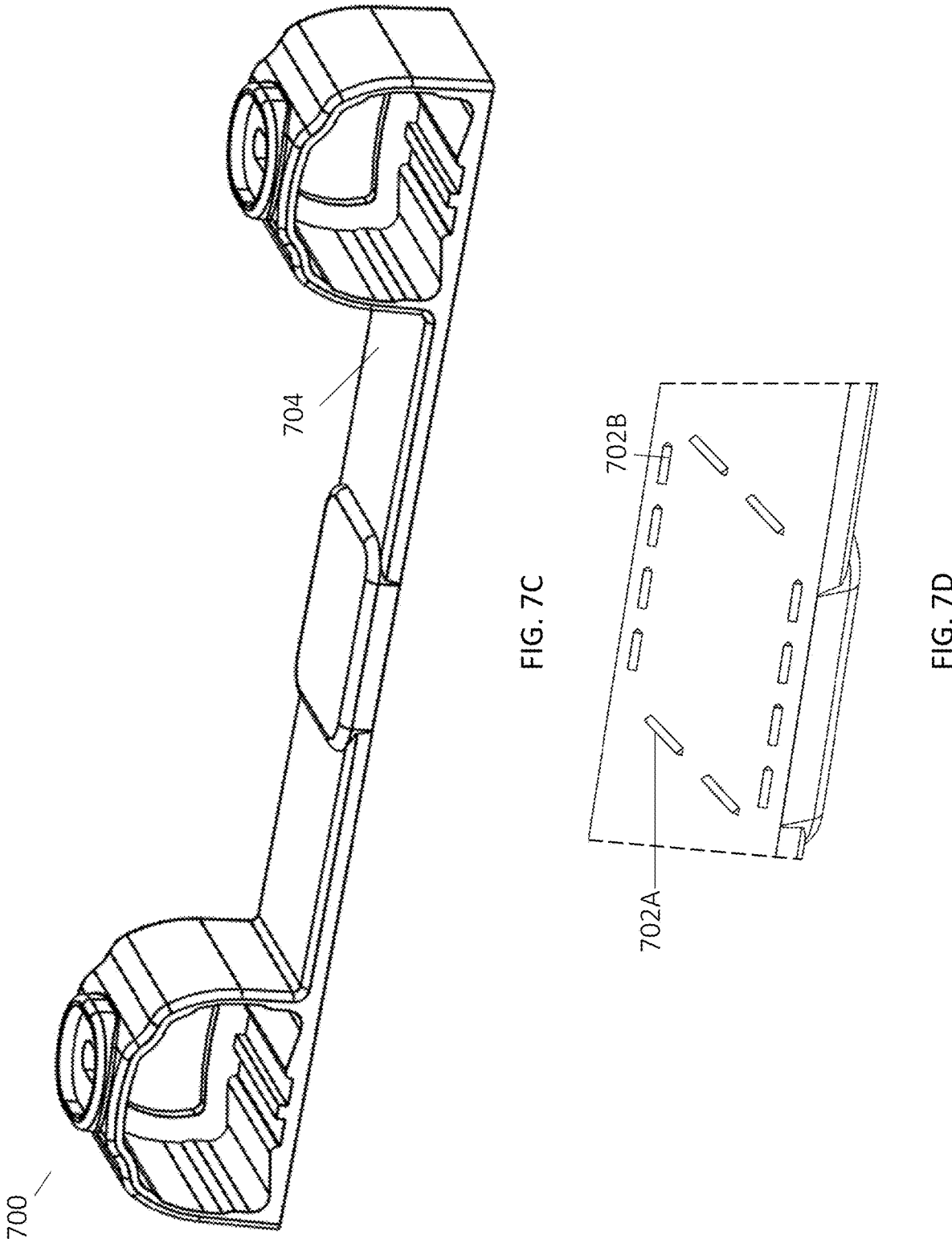
FIG. 7D shows a diagram of a portion of the trolley bracket of FIGS. 7A-7C, according to some embodiments.

FIGS. 7A-7C are diagrams of an exemplary trolley bracket, according to the techniques described herein. FIG. 7A shows a side view of a trolley bracket 700. FIG. 7B shows a perspective view of the trolley bracket 700. FIG. 7C shows a bottom view of the trolley bracket 700.

Trolley bracket 700 may be mounted to a bottom surface in region A of the rear hard-shell housing portion 3B shown in FIG. 1D. Trolley bracket 700 may be mounted in another suitable location.

Trolley bracket 700 may include a body 704. The body 704 may be unitary and may be molded from a plastic material such as but not limited to polycarbonate plastic. Protrusions 702A and 702B may be disposed on the body 704. The protrusions 702A and 702B may be unitary with the body 704. The protrusions may be made of a same material as the body 704.

Protrusion 702A may be disposed along the left side and right side of the body 704 of the trolley bracket 700. Additionally, the protrusions may extend along a width dimension as illustrated by protrusions 702B, which extend along the front and back side of the body 704 in the configuration shown in FIG. 7B.

FIG. 7D shows a diagram of a portion of the trolley bracket of FIGS. 7A-7C. As shown in FIG. 7D, protrusions 702A and 702B may be included which have a cross section that is triangular and which may be used to effect an ultrasonic welding. The exemplary trolley bracket 700 may be used in the ultrasonic welding process shown in FIG. 2A. The protrusions are not so limited and can have another cross-sectional shape, such as a square shape, a circular shape, and/or the like.

Figures 7E, 7F:
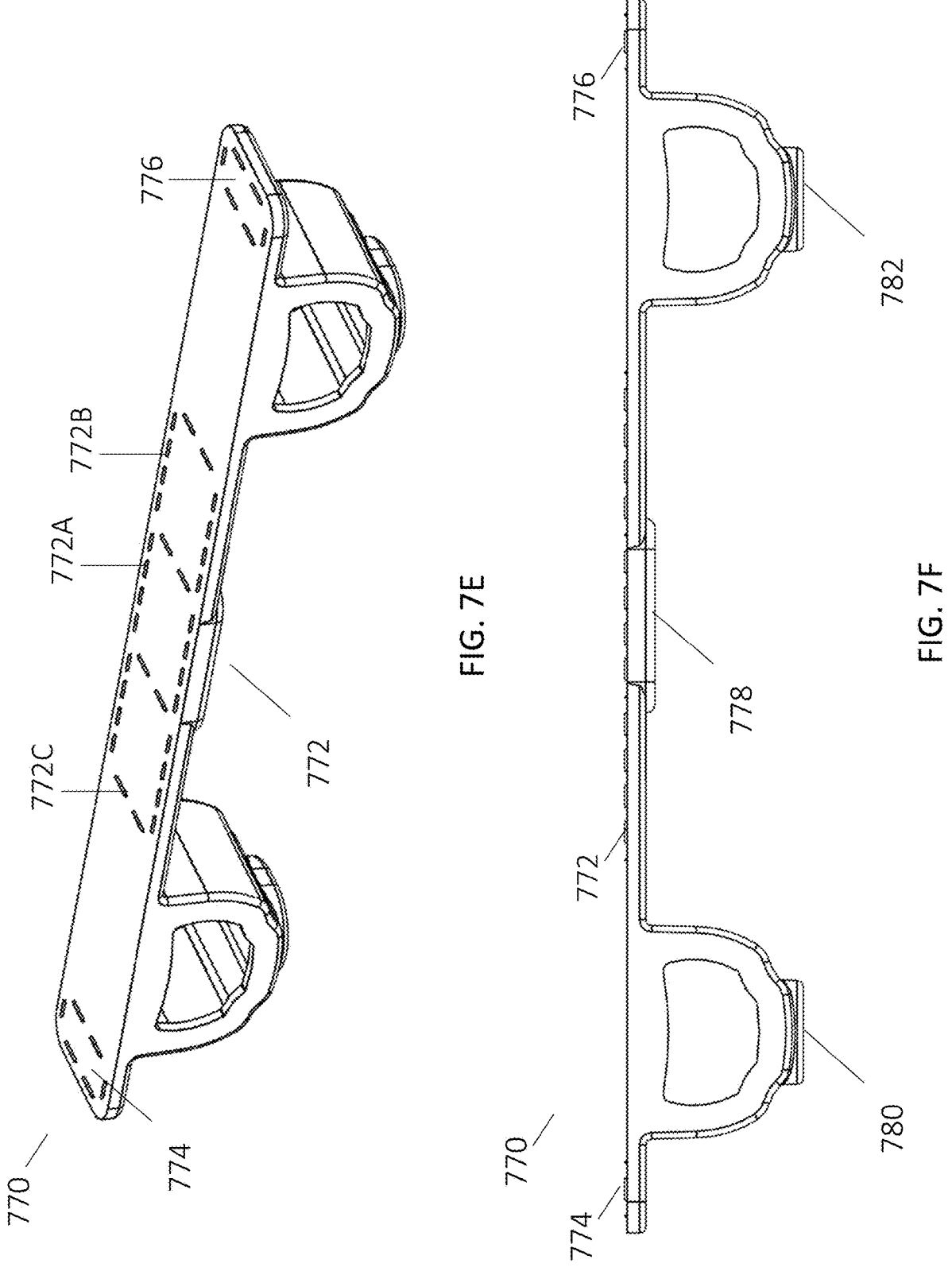
FIGS. 7E-7F are diagrams of an exemplary trolley bracket, according to some embodiments.

It should be appreciated that while FIGS. 7A-7D show one arrangement of the protrusions 702A and 702B (e.g., in a single rectangular arrangement), other arrangements can be used in conjunction with the techniques described herein. FIG. 7E shows a diagram of an exemplary trolley bracket 770 with another example of arrangements of protrusions. Trolley bracket 770 may be configured, for example, as described in relation to trolley bracket 700 shown in FIGS. 7A-7D. Trolley bracket 700 may include a first pattern of protrusions 772, a second pattern of protrusions 774, and a third pattern of protrusions 776, as shown in FIG. 7E. FIG. 7F shows a side view of trolley bracket 700 and the first pattern of protrusions 772, the second pattern of protrusions 774, and the third pattern of protrusions 776.

In this example, the first pattern of protrusions 772 includes three adjacent rectangular arrangements of protrusions 772A, 772B and 772C. In this example, the arrangements 772A and 772B and the arrangements 772A and 772C each share a common side of protrusions (such that there is just a single edge of protrusions between each arrangement). The second pattern of protrusions 774 and the third pattern of protrusions 776 each include a single rectangular arrangement of protrusions.

Each of the first pattern of protrusions 772, the second pattern of protrusions 774, and the third pattern of protrusions 776 in this example includes a rectangular arrangement of protrusions, although it should be appreciated that other geometric arrangements can also be used, such as parallel and/or intersecting lines (e.g., a series of parallel lines, a series of intersecting lines, a combination of parallel and intersecting lines, etc.), one or more ovals and/or circles (e.g., a single circle, one or more arrangements of nested circles and/or one or more arrangements of adjacent circles), one or more rectangles (e.g., a single rectangle, one or more arrangements of nested rectangles and/or one or more arrangements of adjacent rectangles), one or more triangles (e.g., a single triangle, one or more arrangements of nested triangles and/or one or more arrangements of adjacent triangles), and/or the like. The arrangements can also include a combination of shapes, such as an arrangement that includes both curved and straight sides. In some embodiments, the geometric arrangement can be configured based on the horn configuration (e.g., such that at least a portion of the arrangement is configured based on (e.g., to at least partially follow) a shape of the mating portion of the horn that contacts the component on the opposite side of the component). For example, as discussed in conjunction with examples herein, an arrangement can include straight side(s) that are based on (e.g., at least partially follow) straight sides of a mating portion of the horn (e.g., based on sides of the recessed rectangular cavity 582, as an example). As another example, an arrangement can include curved side(s) that are based on (e.g., at least partially follow) curved edges of a mating portion of the horn (e.g., if the horn included a recessed cavity with curved sides, such as a circular or oval cavity). In some embodiments, the geometric arrangement can be configured based on (e.g., to at least partially follow) at least part of an outer perimeter of the portion of the component being welded. For example, as discussed in conjunction with examples herein, an arrangement can include straight side(s) that follow straight edges of the component. As another example, an arrangement can include curved side(s) that follow curved edges of the component. The number of arrangements of protrusions of each pattern can additionally or alternatively vary, and could include one, two, three, four, and/or more arrangements of protrusions. Additionally or alternatively, the number of patterns of protrusions can could include one, two, three, four, and/or more arrangements of protrusions.

The horn may be configured to contact the component at one location. For example, the horn can be configured to contact a central position of the trolly bracket 700 opposite the first pattern of protrusions 772 (e.g., at or near position 778). The horn can additionally or alternatively be configured to contact the component at multiple locations, including for a single weld and/or for multiple welds. For example, the horn can additionally or alternatively be configured to contact the ends of the trolly bracket to weld the second and/or third patterns of protrusions 774 and 776 (e.g., at or near positions 780 and/or 782, respectively, and/or at or near positions opposite the second and/or third patterns of protrusions 774 and 776).

It should also be appreciated that various other materials can be used for the component being welded, such as ABS, etc. As another example, the corner protectors can be affixed to the luggage using ultrasonic welding by using corner protectors that have generally flat/complementary surfaces to the corners of the luggage to where they will be mounted, but have protrusions as discussed herein to facilitate the ultrasonic welding. Further, a horn can be designed for the corner protectors so that the horn applies sharp (e.g., orthogonal) contact to the portions of the corner protector that have the protrusions. Custom welding and/or cooling times can be determined for each part that achieve a sufficient weld for the components of interest.

Figure 8:
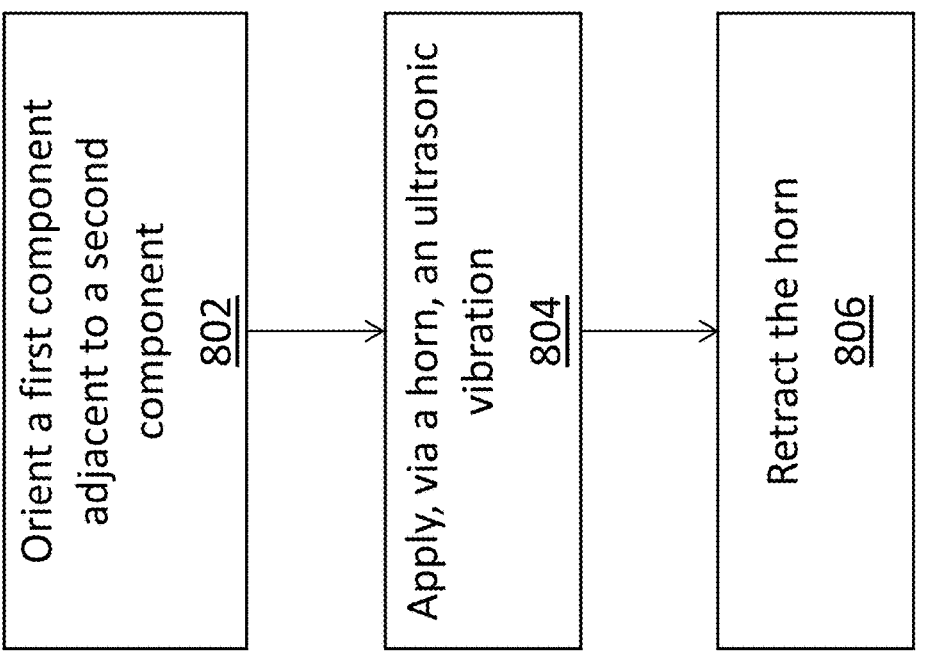
FIG. 8 illustrates a method of manufacturing a luggage component, according to some embodiments.

FIG. 8 illustrates a method of manufacturing a luggage component. The method may begin with step 802 to orient a first component adjacent to a second component. Step 802 may be performed as in step (1) of FIG. 2A described herein. The method may proceed to step 804 to apply, via a horn, an ultrasonic vibration. Step 804 may be performed as in step (4) of FIG. 2A described herein. The method may proceed to step 806 to retract the horn. Step 806 may be performed as in step (6) of FIG. 2A described herein. Some or all steps of the method illustrated in FIG. 8 may be performed to manufacture a luggage component. Additional steps may be performed and the steps may be ordered in any suitable way as the application is not limited in this respect.

14

Figure 9:
FIG. 9 shows an illustrative implementation of a system that may be used to perform any of the aspects of the embodiments.
Figure 9:
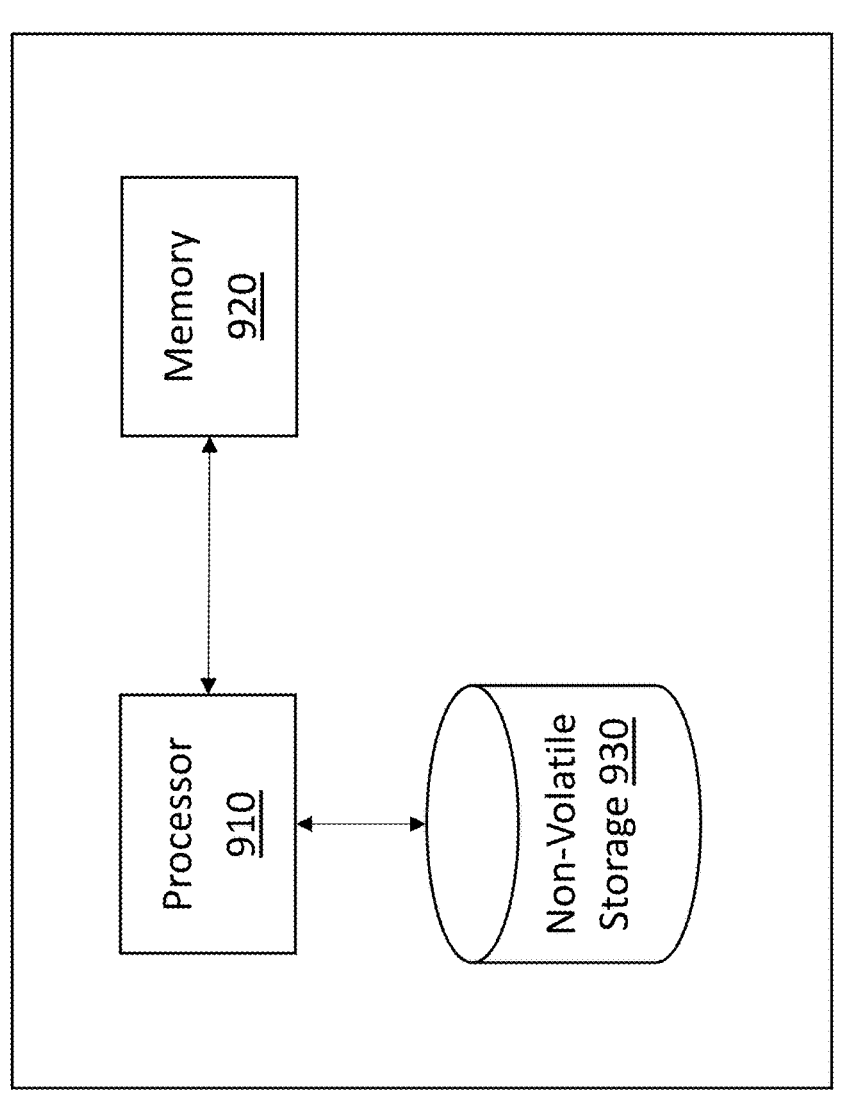

While not shown, in some embodiments a computing device can be used to configure and/or control the ultrasonic welding machine and associated welding process. An illustrative implementation of a system 900 that may be used to perform any of the aspects of the techniques and embodiments disclosed herein is shown in FIG. 9. The system 900 can be in communication with the ultrasonic welding machine described herein. The system 900 may include one or more processors 910 and one or more non-transitory computer-readable storage media (e.g., memory 920 and/or one or more non-volatile storage media 930). The processor 910 may control writing data to and reading data from the memory 920 and the non-volatile storage device 930 in any suitable manner, as the aspects of the techniques described herein are not limited in this respect. To perform functionality and/or techniques described herein, the processor 910 may execute one or more instructions stored in one or more computer-readable storage media (e.g., the memory 920, storage media, etc.), which may serve as non-transitory computer-readable storage media storing instructions for execution by the processor 910.

In connection with techniques described herein, code used to, for example, provide configuration and/or control of the ultrasonic welding process may be stored on one or more computer-readable storage media of system 900. Processor 910 may execute any such code to provide any techniques for providing ultrasonic welding, as described herein. Any other software, programs or instructions described herein may also be stored and executed by system 900. It will be appreciated that computer code may be applied to any aspects of methods and techniques described herein. For example, computer code may be applied to interact with an operating system to provide ultrasonic welding as described herein through conventional operating system processes.

The various methods or processes outlined herein may be coded as software that is executable on one or more processors that employ any one of a variety of operating systems or platforms. Additionally, such software may be written using any of numerous suitable programming languages and/or programming or scripting tools, and also may be compiled as executable machine language code or intermediate code that is executed on a virtual machine or a suitable framework.

In this respect, various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, implement the various embodiments of the techniques described herein. The non-transitory computer-readable medium or media may be transportable, such that the program or programs stored thereon may be loaded onto any computer resource to implement various aspects of the techniques as discussed above.

The terms "program," "software," and/or "application" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the techniques described herein need not reside on a single computer or processor, but may be distributed in a modular fashion among different computers or processors to implement various aspects of the techniques described herein.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in non-transitory computer-readable storage media in any suitable form. Data structures may have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the description provided herein be regarded as including such equivalent constructions insofar as they do not depart from the spirit and scope of the disclosed subject matter.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

What is claimed is:

1. A method of manufacturing a luggage component, the method comprising:
orienting a first component adjacent to a second component, wherein a first surface of the first component adjacent a second surface of the second component comprises a flat portion with one or more protrusions extending from the flat portion; and
applying, via a horn comprising a recess sized to receive the first component, an ultrasonic vibration to melt the one or more protrusions to ultrasonically weld the first component to the second component.

2. The method of claim 1, wherein the first component comprises a loop boss.

3. The method of claim 1, wherein the first component comprises a trolley bracket.

4. The method of claim 1, wherein the second component comprises a polycarbonate plastic.

5. The method of claim 1, wherein the applying of the ultrasonic vibration comprises a weld time between 0.3 seconds and 2 seconds.

6. The method of claim 1, further comprising holding the first component in place for a cooling time between 1 second and 2 seconds.

7. The method of claim 1, wherein the one or more protrusions comprise a first number of protrusions on a first side of the first component and a second number of protrusions on a second side of the first component.

8. The method of claim 1, wherein an arrangement of the one or more protrusions is around an outer perimeter of a rectangular shape.

9. The method of claim 1, wherein the applying of the ultrasonic vibration flattens the one or more protrusions.

10. The method of claim 1, further comprising retracting the horn from the first component and the second component.

11. The method of claim 1, wherein the horn is configured to make an orthogonal contact with the first component relative to the first surface.

12. The method of claim 1, wherein a cross section of the one or more protrusions is triangular.

13. The method of claim 1, wherein the first surface is completely flat surrounding the one or more protrusions on the first surface.

14. The method of claim 3, wherein a cross section of the one or more protrusions is triangular.

15. A luggage component, comprising:
a first component adjacent to a second component, the first component comprising a first surface adjacent a second surface of the second component; and
an interface comprising the second surface of the second component and a first portion of the first surface welded to the second surface of the second component,
wherein the second surface is substantially flat proximate the first surface, and the interface comprises a melted portion that is formed by melting one or more protrusions on the first surface of the first component.

16. The luggage component of claim 15, wherein the first portion of the first surface welded to the second surface comprises a flat surface.

17. The luggage component of claim 16, wherein the first surface is completely flat surrounding the one or more protrusions on the first surface.

18. The luggage component of claim 15, wherein an arrangement of the melted portion is a rectangular shape.

* * * * *